(12) United States Patent
Kim

(10) Patent No.: US 9,906,250 B2
(45) Date of Patent: Feb. 27, 2018

(54) BROADCAST SIGNAL RECEIVING APPARATUS AND CONTROLLING METHOD THEREOF

(71) Applicant: SAMSUNG ELECTRONICS CO., LTD., Suwon-si, Gyeonggi-do (KR)

(72) Inventor: Chang-hyo Kim, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/204,049

(22) Filed: Jul. 7, 2016

(65) Prior Publication Data

US 2017/0026143 A1 Jan. 26, 2017

(30) Foreign Application Priority Data

Jul. 21, 2015 (KR) ........................ 10-2015-0103287

(51) Int. Cl.
*H04B 1/16* (2006.01)
(52) U.S. Cl.
CPC ..................... *H04B 1/16* (2013.01)
(58) Field of Classification Search
CPC ....................................................... H04B 1/16
See application file for complete search history.

(56) References Cited

U.S. PATENT DOCUMENTS

| 2004/0095992 | A1* | 5/2004 | Balaberda | H04B 7/15535 375/213 |
| 2005/0090219 | A1* | 4/2005 | Kang | H04H 20/78 455/296 |
| 2008/0181283 | A1* | 7/2008 | Elhanati | H03G 3/3089 375/130 |
| 2009/0125914 | A1* | 5/2009 | Jung | H04L 51/14 719/313 |
| 2009/0273714 | A1* | 11/2009 | Liou | H04N 5/148 348/572 |
| 2011/0249708 | A1* | 10/2011 | Maca | H04B 7/15564 375/213 |
| 2014/0192262 | A1* | 7/2014 | Takano | H04N 5/08 348/470 |
| 2016/0211898 | A1* | 7/2016 | Cai | H04B 7/0617 |

* cited by examiner

Primary Examiner — Jaison Joseph
(74) Attorney, Agent, or Firm — Nixon & Vanderhye, P.C.

(57) ABSTRACT

A broadcast signal receiving apparatus, a system including the same, and control methods thereof, are disclosed, the broadcast signal receiving apparatus including: a signal receiver configured to receive a radio frequency (RF) broadcast signal; an analog-to-digital (AD) converter configured to convert the received RF broadcast signal to have a digital format; a signal compensator including signal compensating circuitry configured to compensate the RF broadcast signal so that the RF broadcast signal having the digital format has a substantially constant level within a predetermined frequency band; and a digital-to-analog (DA) converter configured to convert the compensated RF broadcast signal to have an analog format. Thus, it is possible to compensate for signal distortion by automatic control using a digital filter in real time.

14 Claims, 21 Drawing Sheets

BROADCAST SIGNAL RECEIVING APPARATUS AND CONTROLLING METHOD THEREOF

CROSS-REFERENCE TO RELATED APPLICATION

This application is based on and claims priority under 35 U.S.C. § 119 to Korean Patent Application No. 10-2015-0103287, filed on Jul. 21, 2015 in the Korean Intellectual Property Office, the disclosure of which is incorporated by reference herein in its entirety.

BACKGROUND

Field

Disclosed apparatuses and methods relate generally to a broadcast signal receiving apparatus, a system including the same, and control methods thereof, and for example to a broadcast signal receiving apparatus capable of compensating a received radio frequency (RF) broadcast signal, a system including the same and control methods thereof.

Description of Related Art

A broadcast signal receiving apparatus receives terrestrial, cable and satellite broadcast signals and process them to be displayed as images. The broadcast signal receiving apparatus may display the processed broadcast signal as an image on its own display panel or may output the processed broadcast signal to another display apparatus having a panel so that the broadcast signal can be displayed as an image on the panel. As an example of the former, there is a television that is also called a display apparatus. As an example of the latter, there is a set-top box.

The broadcast signal receiving apparatus may receive a broadcast signal in various ways. For example, the broadcast signal receiving apparatus may receive a broadcast signal through a cable directly connected to broadcasting equipment of a broadcasting station, or may wirelessly receive a broadcast signal in the form of a radio frequency (RF) signal through an RF antenna to which the broadcast signal receiving apparatus is connected by a wire. Further, the broadcast signal receiving apparatus may receive a broadcast signal through a satellite antenna.

The broadcast signal receiving apparatus processes the received RF broadcast signal to be displayed as an image on the display panel. By the way, if a level of a signal generated through such signal processing processes is not constant within a corresponding bandwidth, this causes deterioration in performance such as distortion in image quality, etc. Therefore, it is visually inconvenient for a user who is watching a broadcast.

SUMMARY

According to an aspect of an example embodiment, a broadcast signal receiving apparatus is provided, including: a signal receiver configured to receive a radio frequency (RF) broadcast signal; an analog-to-digital (AD) converter configured to convert the received RF broadcast signal to have a digital format; a signal compensator comprising signal compensation circuitry configured to compensate the RF broadcast signal so that the RF broadcast signal having the digital format has a substantially constant level within a predetermined frequency band; and a digital-to-analog (DA) converter configured to convert the compensated RF broadcast signal to have an analog format. Thus, it is possible to compensate for signal distortion by automatic control using a digital filter.

The signal compensator may include a first signal compensator including first signal compensation circuitry configured to flatten the level of the RF broadcast signal of a full band corresponding to the frequency band by a predetermined algorithm; and a second signal compensator comprising second signal compensation circuitry configured to divide the flattened RF broadcast signal in accordance with a plurality of frequency bands, and to flatten the levels of the divided signals respectively corresponding to the plurality of frequency bands. Thus, it is possible to expect an effect on compensating the signal so that the level of the signal can be flattened within the full band, while addressing a ringing phenomenon due to a group delay.

The first signal compensator may flatten the level of the RF broadcast signal corresponding to the full band by an algorithm having an inverse function characteristic to a frequency response due to a group delay occurring in a transmitter for the RF broadcast signal. Thus, it is possible to address the group delay occurring in practical environments through a simple algorithm.

The second signal compensator may include a comparator configured to compare the level of the signal corresponding to one among the plurality of frequency bands with a predetermined reference level, and a plurality of digital filters may be configured to selectively apply one between notching and peaking to the signal corresponding to one among the plurality of frequency bands based on a comparison result output from the comparator. Thus, it is possible to easily flatten the signal in such a manner that the notching/peaking is automatically performed corresponding to the level of the signal according to the frequency bands, thereby compensating the signal for the signal distortion caused in a certain frequency band through the level adjustment.

The plurality of digital filters may be connected in cascade, and may include a secondary infinite impulse response (IIR) filter. Thus, the signal compensation for each band is performed while sequentially passing the connected digital filters.

The signal compensator may further include an automatic gain controller comprising automatic gain controlling circuitry configured to automatically control a gain with respect to the compensated RF broadcast signal to keep a constant level of the signal output to the DA converter. Thus, it is possible to keep a constant level of a signal finally output from the signal compensator.

The broadcast signal receiving apparatus may further include a signal separator including circuitry configured to separate the RF broadcast signal converted to have the digital format into a video signal and an audio signal, and the signal compensator may perform compensation with respect to the separated video signal. Thus, it is possible to efficiently compensate the video signal of which distortion is relatively much and provide an image with more improved quality since the broadcast signal is compensated for the signal distortion and decoded.

According to another aspect of an example embodiment, a broadcast signal receiving apparatus is provided, including: a signal receiver configured to receive a radio frequency (RF) broadcast signal; an analog-to-digital (AD) converter configured to convert the received RF broadcast signal to have a digital format; a signal separator comprising signal separating circuitry configured to separate the RF broadcast signal having the digital format into a video signal and an audio signal; and a signal compensator comprising signal compensating circuitry configured to compensate the video signal so that the separated video signal has a substantially constant level within a predetermined frequency band. Thus, it is possible to compensate the video signal of the digital format for the signal distortion through automatic control using the digital filter.

The signal compensator may include a first signal compensator including circuitry configured to flatten the level of the video signal of the full band corresponding to the frequency band by an algorithm having an inverse function characteristic to a frequency response due to a group delay occurring in a transmitter for the RF broadcast signal. Thus, it is possible to expect an effect on compensating the signal so that the level of the signal can be flattened within the full band, while addressing a ringing phenomenon due to a group delay.

The signal compensator may include a second signal compensator comprising signal compensating circuitry configured to compare the level of the video signal with a predetermined reference level in accordance with the plurality of frequency bands, and to selectively adjust the levels of the signals respectively corresponding to the plurality of frequency bands based on a comparison result. Thus, it is possible to efficiently compensate the signal through the level adjustment with respect to the signal distortion occurring in a certain frequency band, in such a manner that the notching/peaking is automatically performed with respect to the level corresponding to each frequency band, while addressing the ringing phenomenon due to the group delay.

The broadcast signal receiving apparatus may further include a digital-to-analog (DA) converter configured to convert the compensated RF broadcast signal to have an analog format, and the signal compensator may further include an automatic gain controller comprising automatic gain controlling circuitry configured to automatically control a gain with respect to the compensated RF broadcast signal so as to keep a substantially constant level of the signal output to the DA converter. Thus, it is possible to keep a substantially constant level of an output signal, and flexibly cope with the signal distortion due to change in environment by compensation of a digital signal.

According to an aspect of an example embodiment, a method of controlling a broadcast signal receiving apparatus is provided, the method including: receiving a radio frequency (RF) broadcast signal; converting the received RF broadcast signal to have a digital format; compensating the RF broadcast signal so that the RF broadcast signal having the digital format can have a constant level within a predetermined frequency band; and converting the compensated RF broadcast signal to have an analog format. Thus, it is possible to compensate for signal distortion by automatic control using a digital filter.

The compensating the RF broadcast signal may include flattening the level of the RF broadcast signal of a full band corresponding to the frequency band by a predetermined algorithm; and dividing the flattened RF broadcast signal according to a plurality of frequency bands, and flattening the levels of the divided signals respectively corresponding to the plurality of frequency bands. Thus, it is possible to expect an effect on compensating the signal so that the level of the signal can be flattened within the full band, while addressing a ringing phenomenon due to a group delay.

The flattening of the level of the RF broadcast signal may include flattening the level of the RF broadcast signal corresponding to the full band by an algorithm having an inverse function characteristic to a frequency response due to a group delay occurring in a transmitter for the RF broadcast signal. Thus, it is possible to address the group delay occurring in practical environments through a simple algorithm.

The flattening the levels of the divided signals may include comparing the level of the signal corresponding to one among the plurality of frequency bands with a predetermined reference level; and selectively applying one between notching and peaking to the signal corresponding to one among the plurality of frequency bands based on a comparison result output from the comparator. Thus, it is possible to easily flatten the signal in such a manner that the notching/peaking is automatically performed corresponding to the level of the signal according to the frequency bands, thereby efficiently compensating the signal for the signal distortion caused in a certain frequency band through the level adjustment.

The compensating the RF broadcast signal may include automatically controlling a gain with respect to the compensated RF broadcast signal so as to keep a constant level of the signal. Thus, it is possible to keep a constant level of a signal finally output from the signal compensator.

The method may further include separating the RF broadcast signal converted to have the digital format into a video signal and an audio signal, and the compensating the RF broadcast signal may include performing compensation with respect to the separated video signal. Thus, it is possible to efficiently compensate the video signal of which distortion is relatively high.

According to another aspect of an example embodiment, a method of controlling a broadcast signal receiving apparatus is provided, the method including: receiving a radio frequency (RF) broadcast signal; converting the received RF broadcast signal to have a digital format; separating the RF broadcast signal having the digital format into a video signal and an audio signal; compensating the video signal so that the separated video signal can have a substantially constant level within a predetermined frequency band; and converting the compensated RF broadcast signal to have an analog format. Thus, it is possible to provide an image with more improved quality since the broadcast signal is compensated for the signal distortion and decoded. Thus, it is possible to compensate the video signal of the digital format for the signal distortion through automatic control using the digital filter.

The compensating the video signal may include flattening the level of the video signal of the full band corresponding to the frequency band by an algorithm having an inverse function characteristic to a frequency response due to a group delay occurring in a transmitter for the RF broadcast signal; and comparing the level of the video signal with a predetermined reference level in accordance with the plurality of frequency bands, and selectively adjusting the levels of the signals respectively corresponding to the plurality of frequency bands based on a comparison result. Thus, it is possible to efficiently compensate the signal through the level adjustment with respect to the signal distortion occurring in a certain frequency band, in such a manner that the notching/peaking is automatically performed with respect to the level corresponding to each frequency band, while addressing the ringing phenomenon due to the group delay.

The compensating the RF broadcast signal may further include automatically controlling a gain with respect to the compensated video signal so as to keep a constant level of the signal. Thus, it is possible to keep a constant level of an output signal, and flexibly cope with the signal distortion due to change in environment by compensation of a digital signal.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein.

DETAILED DESCRIPTION

Below, example embodiments will be described with reference to accompanying drawings to such an extent as to be easily realized by a person having an ordinary knowledge in the art. The disclosure is not limited to the embodiments set forth herein, and may be materialized variously. For clarity, elements not directly related to the elements of the example embodiment may be omitted, and like numerals refer to like elements throughout. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
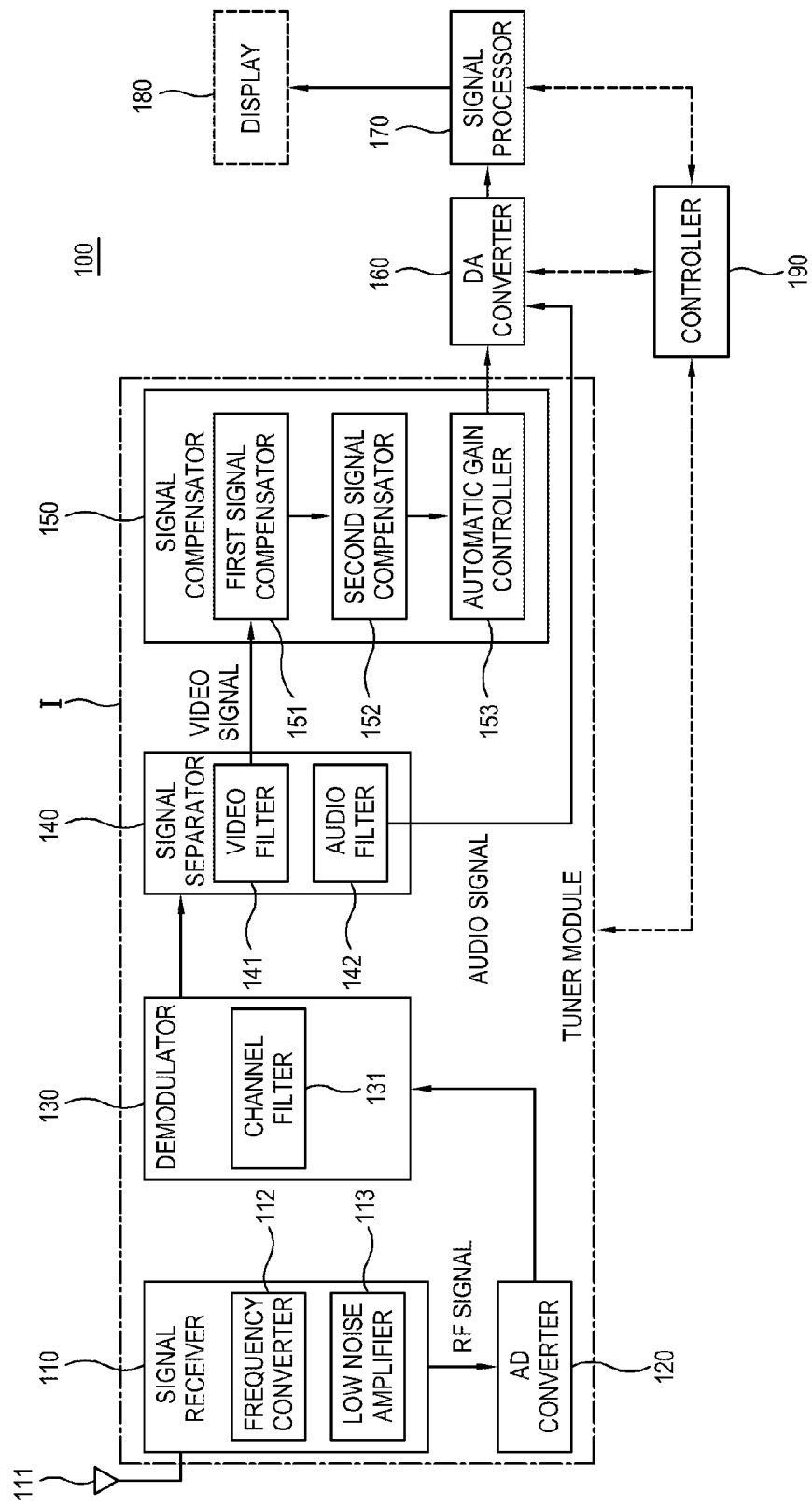
FIG. 1 is a block diagram illustrating an example broadcast signal receiving apparatus according to an example embodiment.
Figure 2:
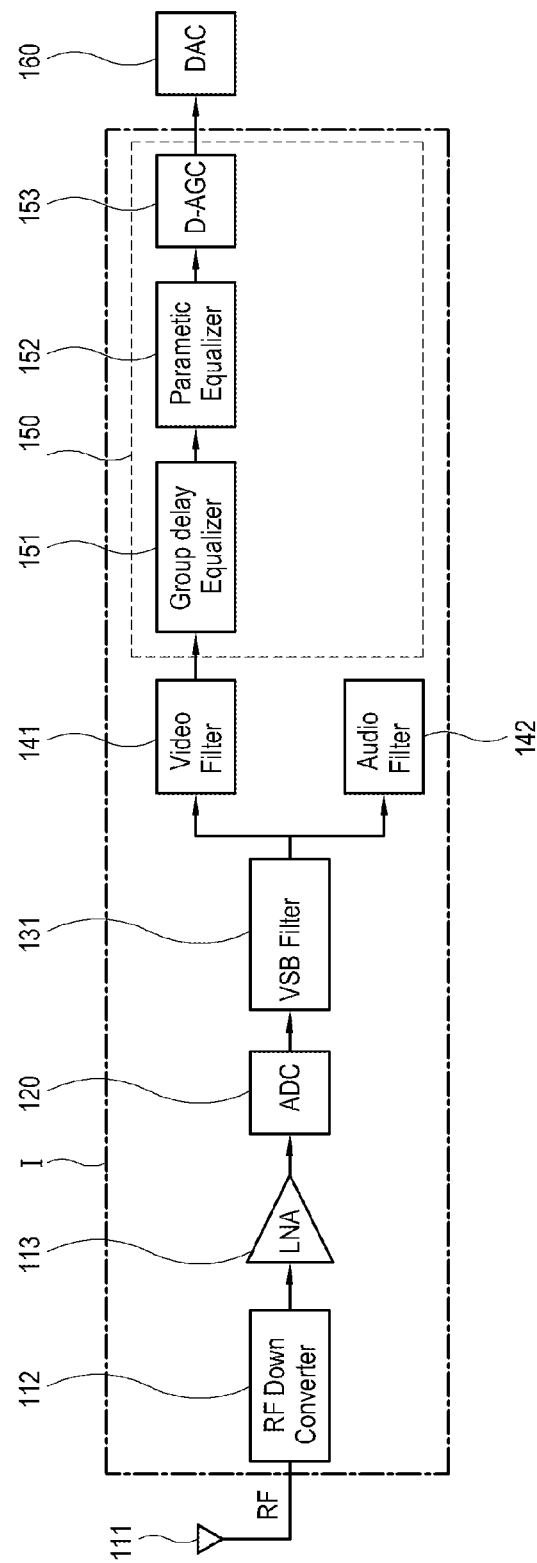
FIG. 2 is a block diagram schematically illustrating some elements included in the broadcast signal receiving apparatus of FIG. 1, in connection with flow of a broadcast signal.

FIG. 1 is a block diagram of a broadcast signal receiving apparatus 100 according to an example embodiment, and FIG. 2 is a block diagram illustrating some elements included in the broadcast signal receiving apparatus 100 of FIG. 1, in connection with flow of a broadcast signal.

In FIG. 1, the broadcast signal receiving apparatus 100 is a display apparatus with a display 180, such as a television (TV), which displays an image based on a broadcast signal. According to an example embodiment, the broadcast signal receiving apparatus 100 may be achieved various apparatuses such as a set-top box (STB), which receives and processes a broadcast signal and outputs it to a separately connected display apparatus.

The broadcast signal receiving apparatus 100 receives a broadcast signal from a broadcasting station and the like signal source, e.g., from a headend. The broadcast signal receiving apparatus 100 according to an example embodiment may receive a broadcast signal through a cable, an antenna provided for receiving a terrestrial or satellite signal or the like.

The broadcast signal receiving apparatus 100 processes the received broadcast signal to be displayed as an image. If the broadcast signal receiving apparatus 100 is the set-top box, the processed video signal is output to and thus displayed in a separate display apparatus. On the other hand, if the broadcast signal receiving apparatus 100 is a television, it can display a broadcast image by itself.

The broadcast signal receiving apparatus 100 according to an example embodiment is internally mounted with at least one component for processing a broadcast signal received from the exterior, and includes a printed circuit board (PCB) formed with transmission lines for electrically connecting the mounted components.

This embodiment shows that the broadcast signal receiving apparatus 100 is achieved to process a broadcast signal based on a broadcast signal/broadcast information/broadcast data received from a signal source. However, the kind of video signal to be processed in the broadcast signal receiving apparatus 100 is not limited to the broadcast signal. For example, the broadcast signal receiving apparatus 100 may receive a signal from various external apparatuses, e.g. a smart phone, a smart pad such as a tablet personal computer (PC), a mobile device including an MP3 player, a PC such as a desktop computer or a laptop computer, etc.

Further, the broadcast signal receiving apparatus 100 may process a signal so that the display apparatus 101, 103 can display a moving image, a still image, an application, an on-screen display (OSD), a user interface (UI or also called a graphic user interface (GUI)) for controlling various operations, etc. based on signal/data stored in an internal/external storage medium.

The broadcast signal received in the broadcast signal receiving apparatus 100 is received through a terrestrial wave, a cable, a satellite, etc. and a signal source in this example embodiment is not limited to the broadcasting station. That is, the image source may include any device or station as long as it can transmit and receive information.

In this example embodiment illustrated in FIG. 1, the broadcast signal receiving apparatus 100 may be achieved by a Smart TV or an Internet Protocol (IP) TV. The Smart TV can receive and display a broadcast signal in real time, and has a web browsing function so that the broadcast signal can be displayed in real time and at the same time various contents can be searched and consumed through Internet. To this end, the smart TV provides an interface convenient for a user. Further, the smart TV includes an open software platform in order to provide an interactive service to a user.

Therefore, the smart TV may provide a user with an application that offers various contents, e.g., a predetermined service to a user through the open software platform. Such an application is an application program capable of providing various kinds of service. For example, the application includes applications for social network service (SNS), finance, news, weather, a map, music, movie, a game, an electronic book, etc.

If the broadcast signal receiving apparatus 100 is achieved by the set-top box, a user may further get video on demand (VOD) or the like service from a service provider through the set-top box. Further, the broadcast signal receiving apparatus 100 may be a monitor or the like connected to a computer.

In other words, the following embodiments to be described later are just examples that may vary depending on the systems, and thus do not limit the scope of the disclosure.

Below, details of the broadcast signal receiving apparatus according to an example embodiment will be described with reference to accompanying drawings.

As illustrated in FIG. 1, the broadcast signal receiving apparatus 100 according to an example embodiment includes a signal receiver 110 which receives a radio frequency (RF) broadcast signal; an analog-to-digital converter (ADC) 120 which converts the received RF broadcast signal to have a digital format; a demodulator 130 which demodulates the broadcast signal having the digital format; a signal separator (e.g., including signal separating circuitry) 140 which separates the broadcast signal into a video signal and a audio signal; a signal compensator (e.g., including signal compensating circuitry) 150 which compensates at least one of the video signal and the audio signal; a digital-to-analog converter (DAC) 160 which converts the compensated RF broadcast signal to have an analog format; a signal processor 170 which processes the RF broadcast signal having the analog format to be displayed as an image; a display 180 which displays an image based on the processed broadcast signal; and a controller 190 which controls the broadcast signal receiving apparatus 100.

Here, the signal receiver 110, the AD converter 120, the demodulator 130, the signal separator 140 and the signal compensator 150 may be provided as a tuner module (or a tuner/demodulator module) I mounted on to the PCB placed inside the broadcast signal receiving apparatus 100. The tuner module I may be achieved by at least one component, e.g. an integrated chip (IC) corresponding to one or more of the foregoing elements 110 to 150. That is, the embodiments illustrated in FIG. 1 and FIG. 2 illustrate that the tuner module I, where the RF tuner and the demodulator are integrated, is provided in the broadcast signal receiving apparatus 100, but not limited thereto. Alternatively, the tuner and the demodulator may be individually provided in the broadcast signal receiving apparatus 100.

Although it is not shown, the broadcast signal receiving apparatus 100 may further include a user input interface to receive a user's input, a communicator (e.g., including communication circuitry) to perform wired/wireless network communication with the exterior, a storage to store various pieces of data, a power supply to supply power to the respective elements of the broadcast signal receiving apparatus 100, etc.

The user input interface receives a user's control and input to the broadcast signal receiving apparatus 100 and transmits various preset commands or unrestricted information to the controller 190. The user input interface includes a keypad (or an input panel) provided with a power key, a numeral key, a menu key, etc. provided in the broadcast signal receiving apparatus 100; an input device such as a remote controller, a key board, a mouse, etc. provided separately from the broadcast signal receiving apparatus 100 and generating and transmitting a preset command/data/information/signal to broadcast signal receiving apparatus 100 so as to remotely control the broadcast signal receiving apparatus 100.

The storage stores unrestricted data under control of the controller 190. The storage may include a nonvolatile memory, a volatile memory, a flash memory, a hard disk drive (HDD) or a solid state drive (SSD). The storage is accessed by the controller 190, and thus the controller 190 performs reading/recording/modifying/deleting/updating, etc. with regard to data.

The data stored in the storage may for example include not only an operating system (OS) for operating the broadcast signal receiving apparatus 100, but also various applications running on this operating system, video data, additional data, etc.

Specifically, the storage may store a signal or data to be input/output in response to the operations of the elements 110 to 180. Further, the storage may store a control program for controlling the broadcast signal receiving apparatus 100, a graphic user interface (GUI), which is related to an application provided by a manufacturer or downloaded from the exterior, images for providing the GUI, user information, documents, databases or relevant data.

In this example embodiment, the storage refers to a storage medium, a read only memory (ROM, not shown) in the controller, a random access memory (RAM, not shown), or a memory card (e.g. a micro SD card, a memory stick, not shown) mounted to the broadcast signal receiving apparatus 100.

The communicator includes a wired/wireless communication module including various communication circuitry for performing communication with various external apparatuses including the input device. The communicator transmits a command/data/information from the external apparatus to the controller 190. On the other hand, the communicator may transmit a command/data/information from the controller 190 to the external apparatus.

The communicator supports a wired or wireless communication interface to perform data communication with the exterior. For example, the communicator may support at least one of communication interfaces 1 to N such as a wired local area network (LAN), Bluetooth, Wi-Fi Direct, radio frequency (RF), ZigBee, a wireless LAN, Wi-Fi, infrared communication, ultra wideband (UWB), near field communication (NFC), etc. Here, the communicator may employ a wireless communication method for communication between the broadcast signal receiving apparatus 100 and the input device.

Besides, the communicator may receive a video signal based on composite video, component video, super video, Syndicat des Constructeurs d'Appareils Radiorécepteurs et Téléviseurs (SCART), high definition multimedia interface (HDMI) or the like standards through a wire or a cable.

The communicator in this example embodiment is placed inside the broadcast signal receiving apparatus 100, but not limited thereto. Alternatively, the communicator may be achieved in the form of a dongle or a module detachably connected to a connector (not shown) of the broadcast signal receiving apparatus 100.

The power supply supplies power to each of the elements of the broadcast signal receiving apparatus 100 under control of the controller 190. The power supply converts external alternating current (AC) power into direct current (DC) power, and regulates the DC power to have a predetermined level, thereby supplying the regulated power to each of the elements in the broadcast signal receiving apparatus 100. For example, the power supply may be achieved by a switching mode power supply (SMPS) and include a power converter having a transformer circuit or the like that makes the DC power be dropped to a predetermined level and thus transformed into voltages corresponding to the rated voltages of the respective elements of the broadcast signal receiving apparatus 100.

The signal receiver 110 receives an analog broadcast signal of an RF band. The broadcast signal is divided according to channels corresponding to predetermined frequency bands, and the signal receiver 110 receives a broadcast signal of a channel selected by a user. The received broadcast signal is converted into an intermediate frequency (IF) signal of an IF band and then output.

The frequency band of the RF broadcast signal received in the signal receiver 110 may correspond to the channel selected by a user through the user input interface.

As illustrated in FIG. 1 and FIG. 2, the signal receiver 110 may include an antenna (ANT) 111 for receiving an RF broadcast signal, a frequency converter (e.g. an RF down converter) 112 for converting the received broadcast signal to have an intermediate frequency band, e.g., down conversion, and a low noise amplifier (LNA) 113 for applying low-noise amplification to the converted RF signal having the intermediate frequency band. The low noise amplifier 113 amplifies only a signal component of the RF broadcast signal while minimizing noise.

In the broadcast signal receiving apparatus 100 according to this example embodiment, the signal receiver 110 may be achieved to include a cable modem, which connects with a signal source such as a broadcasting station, a cable broadcaster, etc. and receives a broadcast signal, e.g., video/audio/data signals, and to receive the RF broadcast signal through a cable connected to the cable modem.

The AD converter 120 receives a broadcast signal of an intermediate frequency band from the signal receiver 110, and converts the received IF signal into a signal having a predetermined digital format through sampling, quantizing and coding processes according to sampling frequencies. The broadcast signal converted to have the digital format is output to the demodulator 130.

The demodulator 130 demodulates the converted broadcast signal of the digital format into a signal in the form of a transport stream (TS). The demodulator 130 receives signals corresponding to an I channel and a Q channel, and demodulates them, thereby outputting a TS signal.

The demodulator 130 may include a channel filter 131 which filters, e.g., sharply cuts the output of the AD converter 120 according to bandwidths (BW, e.g. 6 MHz, 7 MHz, 8 MHz, etc.) corresponding to broadcasting systems such as a national television system committee (NTSC), a phase alternation line (PAL), Séquentiel couleur avec mémoire (SECAM), etc.

In this embodiment, the demodulator 130 may receive and demodulate a broadcast signal modulated by a vestigial side band (VSB) scheme. In this case, the channel filter 131 may be achieved by a VSB filter that performs VSB filtering with a predetermined number of tabs as illustrated in FIG. 2.

The broadcast signal received in the broadcast signal receiving apparatus 100 according to an example embodiment may be modulated by another scheme as well as the VSB scheme. For example, the demodulator 130 may be provided to demodulate an analog broadcast signal modulated by quadrature amplitude modulation (QAM), single sideband modulation (SSB) and 8-vestigial side band (8VSB) or the like scheme.

The signal separator 140 includes various signal separating circuitry (e.g., filters) configured to separate the broadcast signal passed through the channel filter 131 into a video signal (or an image signal) and an audio signal (or a voice signal). As illustrated in FIG. 1 and FIG. 2, the signal separator 140 in this embodiment includes a video filter 141 for separating out a video signal, and an audio filter 142 for separating out an audio signal.

The analog broadcast signal received in the broadcast signal receiving apparatus 100 according to an example embodiment may include additional information (e.g. a vertical blanking interval (VBI) data signal) overlapped with a certain portion of the broadcast signal, e.g., a vertical blanking interval (VBI) portion in accordance with its broadcasting scheme. The additional information carried by the VBI data signal includes closed caption information, teletext information, copy generation management system (CGMS) information, sound multiplex index information, etc.

Thus, the signal separator 140 of the broadcast signal receiving apparatus 100 according to an example embodiment may further include a filter (not shown) for separating a variety of pieces of additional data from the broadcast signal. The data types and lines for these pieces of additional information may be varied depending on the broadcasting schemes.

The video filter 141 separates a video signal, e.g., data corresponding to video content, from the broadcast signal passed through the channel filter 131.

Figure 3:
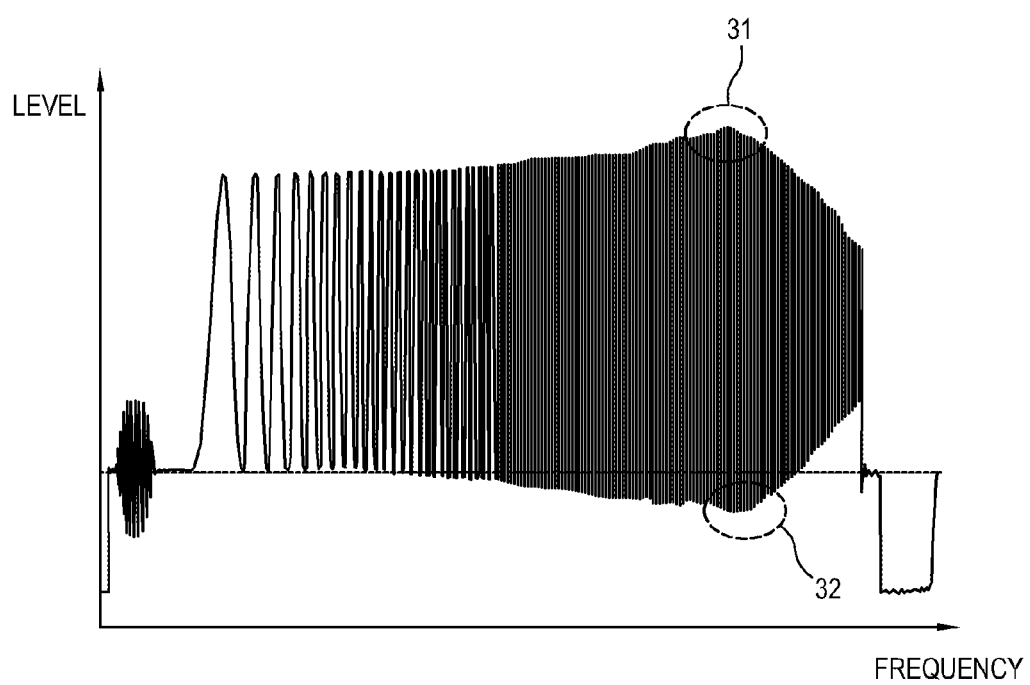
FIG. 3 is a diagram illustrating an example video signal separated by the video filter.

FIG. 3 is a diagram illustrating an example video signal separated by the video filter 141.

As illustrated in FIG. 3, a video signal separated from a broadcast signal is a signal of a predetermined frequency band. That is, the video signal has a predetermined level within the frequency band.

Referring to FIG. 3, the video signal may have portions 31 and 32 where a frequency characteristic, e.g., its level is not constant within a bandwidth, and for example abnormally becomes larger at a high band. In this frequency band, signal distortion may occur by various causes such as a group delay due to a transmission line characteristic of a transmitter for a broadcast signal, change in a PCB pattern in a manufacturing process, etc.

The group delay may bring a wave phenomenon, e.g., a ringing phenomenon that vibration is generated in certain portions of a waveform, and thus image quality may be deteriorated in such a manner that a vibration pattern is seen like a shadow in some images, etc. Further, it is difficult to exclude potential signal distortion since a nonstandard signal or the like having a different frequency characteristic may be applied even though the frequency characteristic (e.g., the level) is controlled to be regular in the manufacturing process.

The signal compensator 150 includes various signal compensating circuitry configured to compensate an RF broadcast signal so that the RF broadcast signal of the digital format can have an equalized level within a predetermined frequency band. That is, as illustrated in FIG. 1 and FIG. 2, the signal compensator 150 performs the compensation so that the video signal separated by the video filter 141 can have an equalized/flat/smooth frequency characteristic, e.g., an equalized/flat/smooth signal level/amplitude within the corresponding frequency band.

FIG. 1 and FIG. 2 illustrate that the signal compensator 150 compensates the video signal, but the audio signal may also have similar signal distortion. Accordingly, the signal compensator 150 according to an example embodiment may be achieved to compensate both the video signal and the audio signal.

Below, the signal compensator 150 will be described with respect to the video signal.

As illustrated in FIG. 1, the signal compensator 150 in this embodiment includes a first signal compensator (e.g., including signal compensating circuitry) 151, a second signal compensator (e.g., including signal compensating circuitry) 152 and an automatic gain controller 153.

The first signal compensator 151 may be achieved by a group delay equalizer as illustrated in FIG. 2, which primarily flattens the level of the RF broadcast signal of the full band corresponding to a predetermined frequency band by a predetermined algorithm.

Specifically, the first signal compensator 151 may include a full-band filter, e.g., an all pass digital filter that flattens the level of the RF broadcast signal of the full band by an algorithm having an inverse function characteristic of a frequency response due to the group delay caused in the transmitter for the RF broadcast signal. Here, the frequency response characteristic due to the group delay is a measured value.

Figure 4:
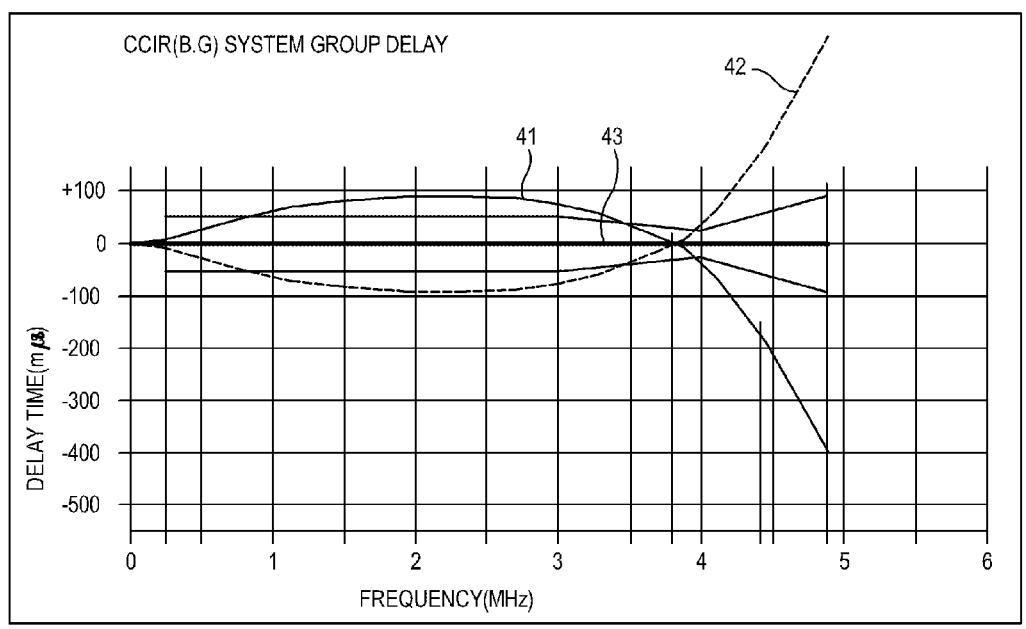
FIG. 4 is a graph of illustrating example characteristics of a group delay in the broadcast signal receiving apparatus according to an example embodiment.
Figure 5:
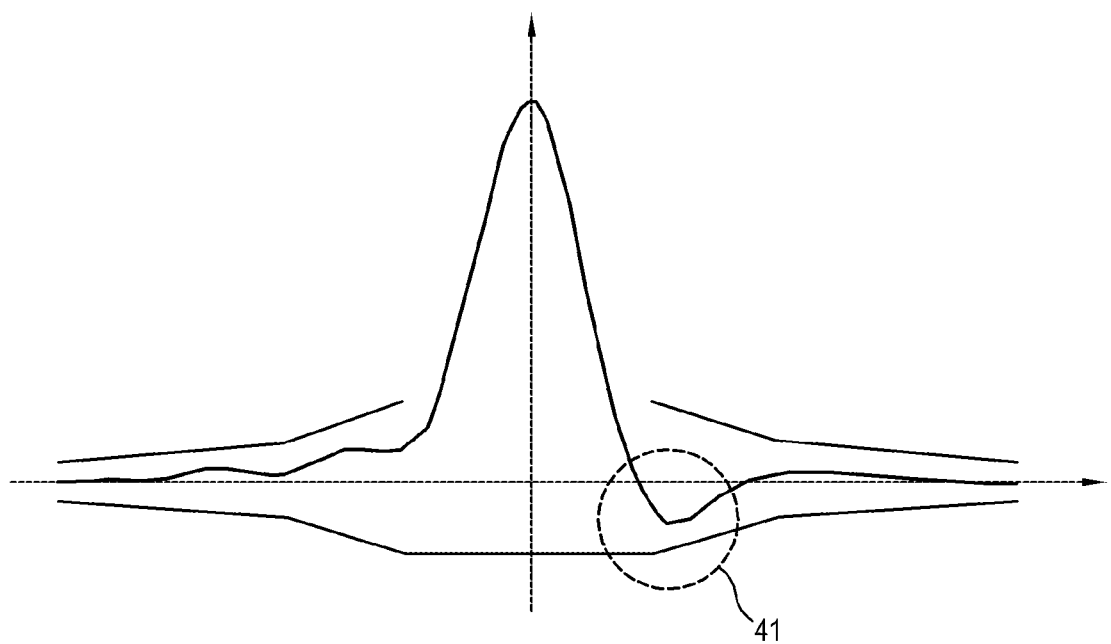
FIG. 5 is a graph illustrating an example ringing phenomenon caused by the group delay.
Figure 6:
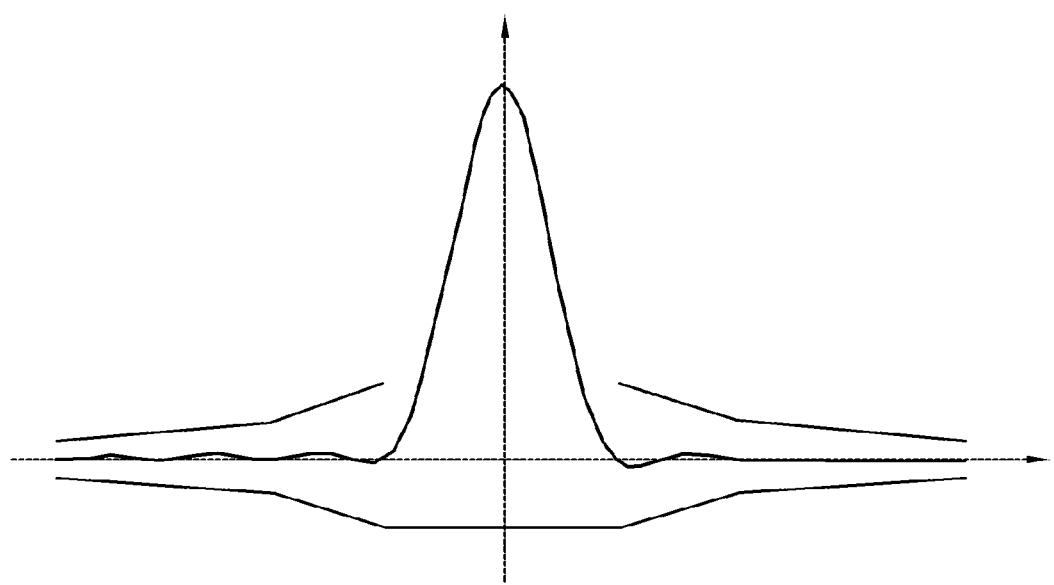
FIG. 6 is a graph illustrating an example ringing phenomenon after compensating for the group delay.

FIG. 4 is a graph of illustrating example characteristics of a group delay in the broadcast signal receiving apparatus 100 according to an example embodiment, FIG. 5 is a graph illustrating an example ringing phenomenon caused by the group delay, and FIG. 6 is a graph illustrating the example ringing phenomenon after compensating for the group delay.

The RF broadcast signal received in the broadcast signal receiving apparatus 100 has a group delay characteristic 41 as illustrated in FIG. 4.

The group delay characteristic 41 may be measured while developing/manufacturing the broadcast signal receiving apparatus 100 or a PCB with the tuner module I.

The first signal compensator 151 compensates a broadcast signal, and more particularly a video signal of the broadcast signal by an algorithm having an opposite form of the group delay characteristic 41 of FIG. 4, e.g., an inverse function characteristic 42. FIG. 4 illustrates that the group delay characteristic 41, the inverse function characteristic 42 and the characteristic 43 flattened after the compensation of the first signal compensator 151 (e.g., constant group delay).

FIG. 5 illustrates a ringing phenomenon occurring in a video signal due to a group delay is represented with a predetermined factor (e.g. 2T pulse), in which left and right sides are unbalanced at a portion 33.

On the other hand, the video signal passed through the first signal compensator 151 is compensated for the group delay and thus balanced, e.g., equalized as illustrated in FIG. 6 with respect to the left and right sides, without being inclined or biased toward one side.

The second signal compensator 152 may be achieved by a parametric equalizer as illustrated in FIG. 2, which divides the primarily-flattened RF broadcast signal according to a plurality of frequency bands (hereinafter, referred to as sub bands), and secondarily flattens the level of the signal with respect to each sub band.

Here, the number of sub bands may correspond to broadcasting schemes. For example, the band of 5 MHz is employed for the NTSC scheme generally used in the United states/Korea, in which a video signal has a bandwidth of 4.2 MHz. On the other hand, the band of 6 MHz is employed for the PAL scheme generally used in Europe, in which a video signal has the maximum bandwidth of 6 MHz.

In the case of NTSC using the bandwidth of 5 MHZ, the second signal compensator 152 of the broadcast signal receiving apparatus 100 in this example embodiment divides the broadcast signal according to five sub bands. Further, in the case of PAL using the bandwidth of 6 MHz, the second signal compensator 152 divides the broadcast signal according to six sub bands. FIG. 7 to FIG. 15 illustrate the second signal compensator 152 of when the broadcast signal is divided corresponding to five sub bands.

Figure 7:
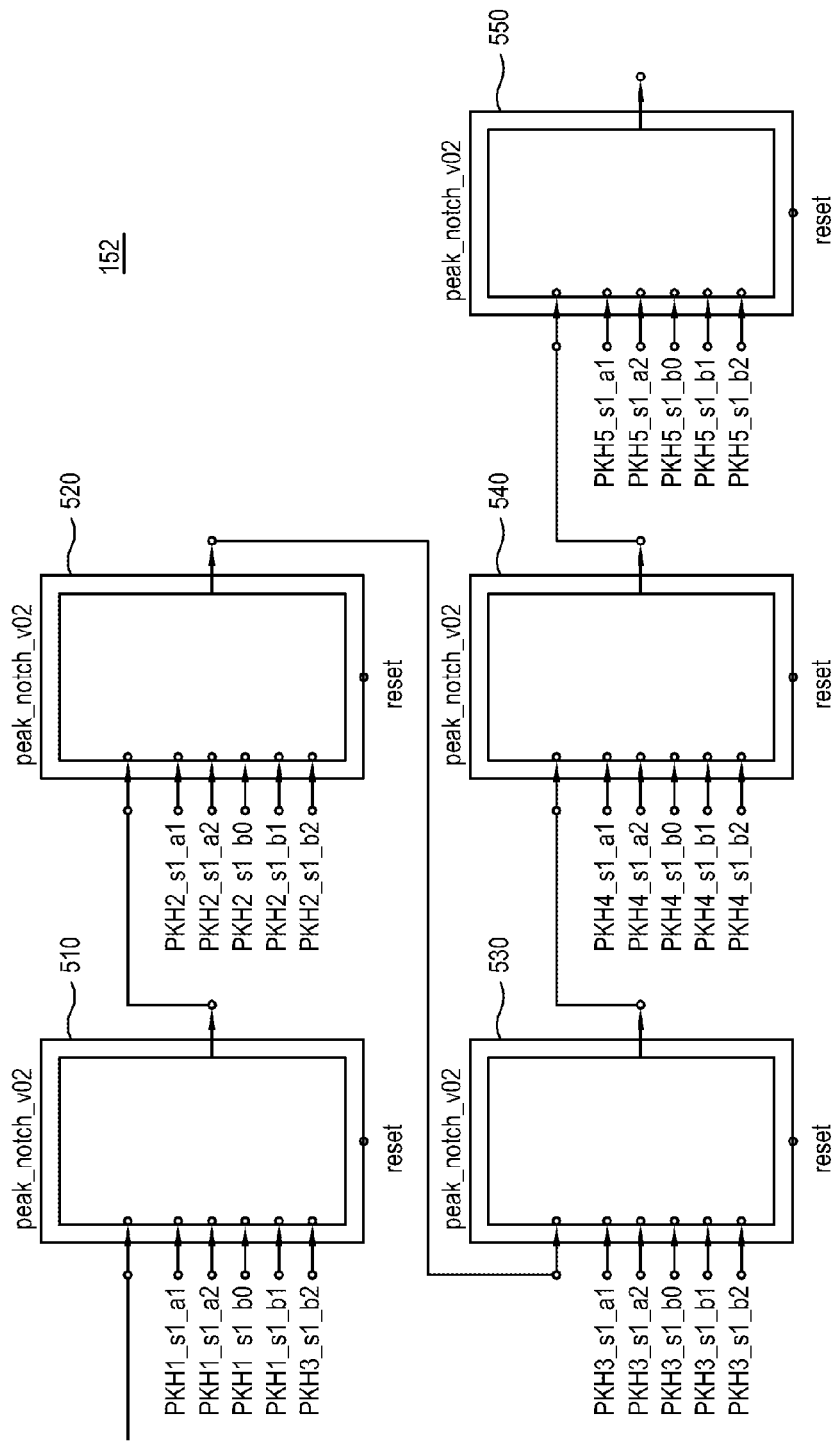
FIG. 7 is a block diagram illustrating an example second signal compensator in the broadcast signal receiving apparatus according to an example embodiment.
Figure 8:
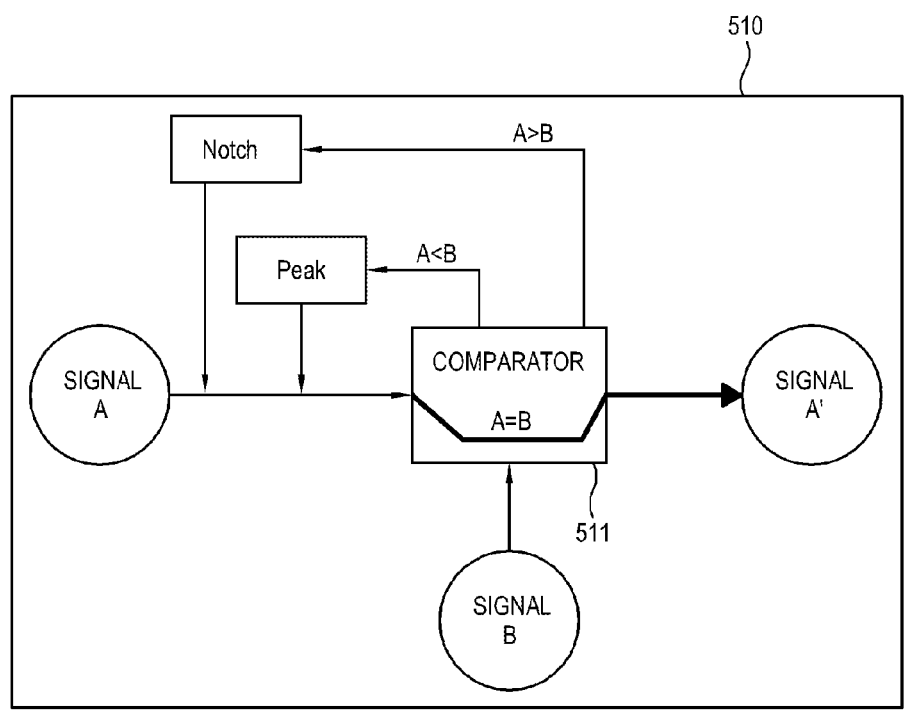
FIG. 8 is a block diagram illustrating an example of a certain filter provided in the second signal compensator of FIG. 7.

FIG. 7 is a block diagram illustrating the second signal compensator 152 in the broadcast signal receiving apparatus 100 according to an example embodiment, and FIG. 8 is a block diagram illustrating an example of a certain filter 510 provided in the second signal compensator 152 of FIG. 7.

Figure 9:
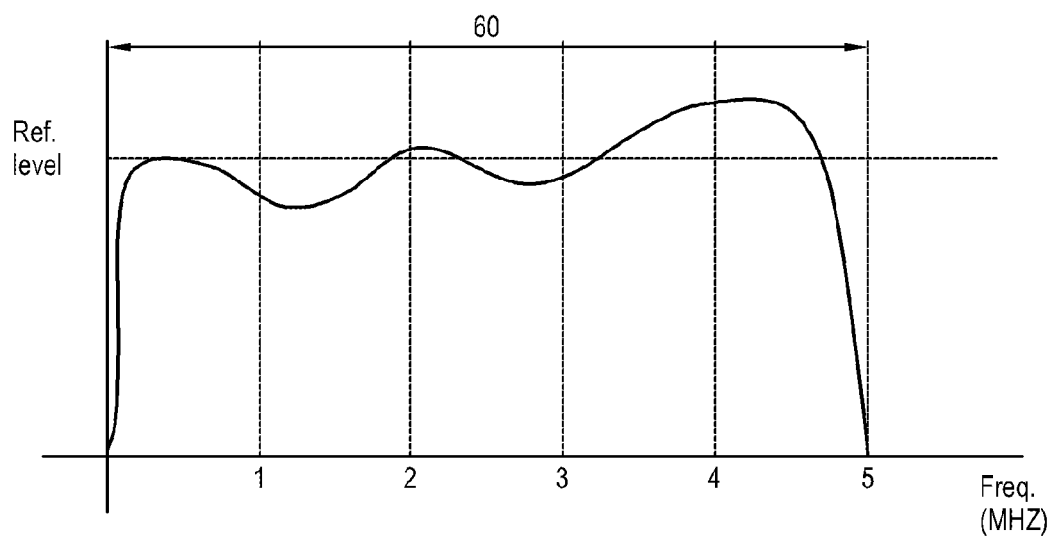
FIG. 9 is a graph illustrating an example full band signal input to the second signal compensator.
Figure 13:
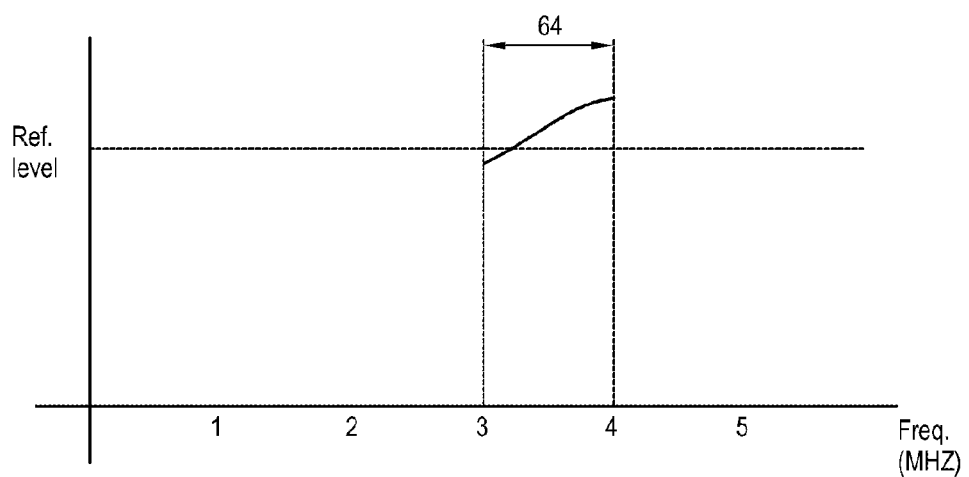
Figure 14:
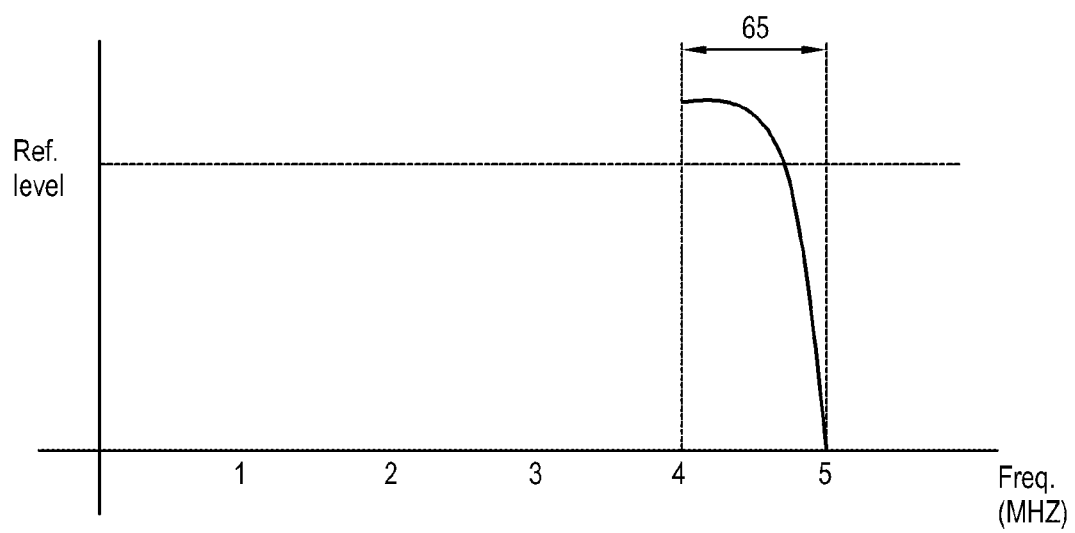
Figure 15:
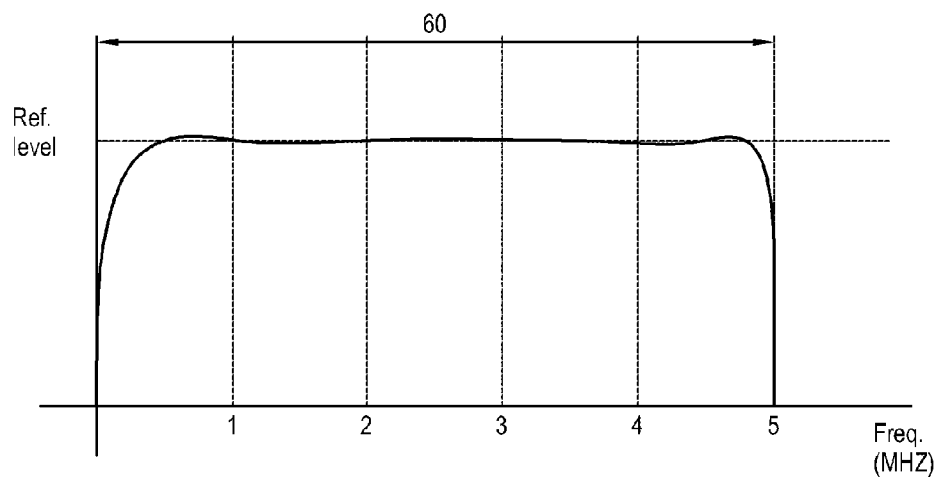
FIG. 15 is graph illustrating an example full band signal output from the second signal compensator.

FIG. 9 is a graph illustrating an example full band signal 60 input to the second signal compensator 152, and FIG. 10 to FIG. 14 are graphs illustrating example signals respectively corresponding to a plurality of frequency bands 61, 62, 63, 64 and 65, passed through respective filters 510, 520, 530, 540 and 550, and FIG. 15 is graph illustrating an example full band signal 60 output from the second signal compensator 152.

The second signal compensator 152 compares the level of the signal with a predetermined reference level with respect to each of the plural frequency bands 61, 62, 63, 64 and 65, and selectively adjusts the level of the signal corresponding to each of the plural frequency bands 61, 62, 63, 64 and 65 based on the comparison results.

As illustrated in FIG. 9, the full band signal input to the second signal compensator 152 may have inconstant levels with respect to a reference level (Ref. level) throughout the full frequency band 60, and may have different deviations from the reference level according to the frequency bands.

Thus, the second signal compensator 152 includes a plurality of digital filters, that is, first to fifth filters 510, 520, 530, 540 and 550 respectively corresponding to the plurality of frequency bands 61, 62, 63, 64 and 65 as illustrated in FIG. 7. The first to fifth filters 510, 520, 530, 540 and 550 may be sequentially connected in series, that is, in the form of a cascade.

Figure 10:
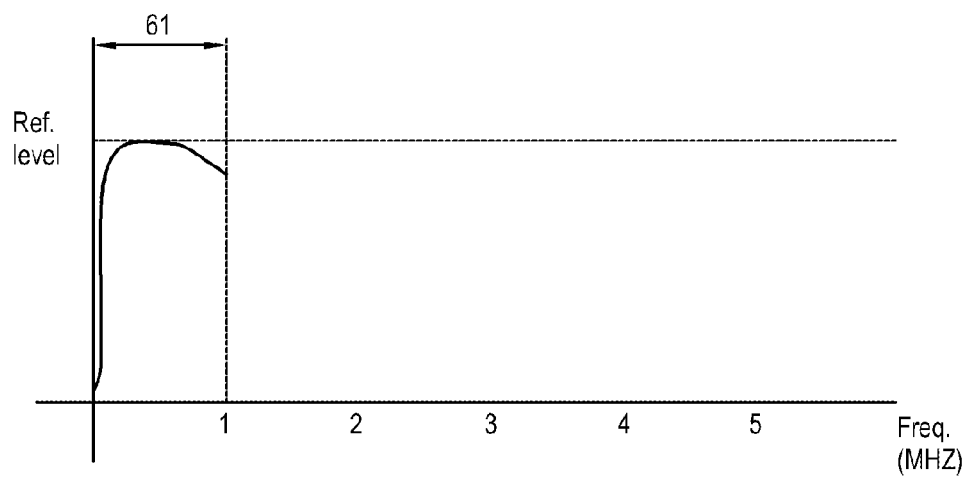
FIG. 10 to FIG. 14 are graphs illustrating example signals respectively corresponding to a plurality of frequency bands, passed through respective filters.
Figure 11:
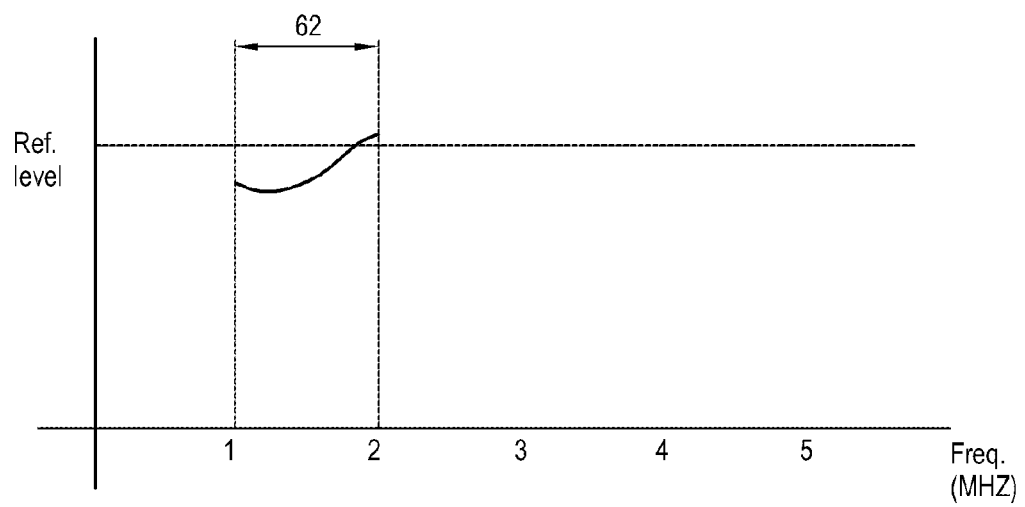
Figure 12:
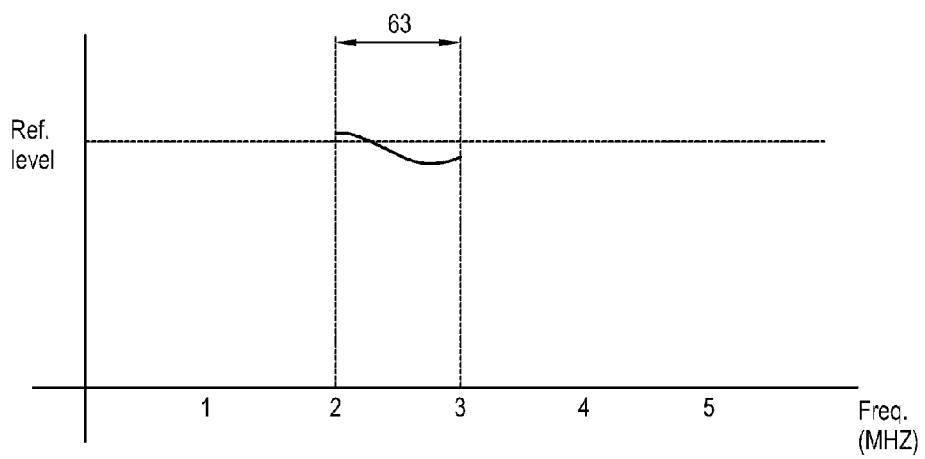

The first to fifth filters 510, 520, 530, 540 and 550 selectively pass broadcast signals of bands respectively corresponding thereto. Specifically, the first filter (filter 1) 510 passes a broadcast signal of a first band (band 1) 61 as illustrated in FIG. 10, and the second filter (filter 2) 520 passes a broadcast signal of a second band (band 2) as illustrated in FIG. 11. Likewise, the third filter (filter 3) 530 passes a broadcast signal of a third band (band 3) 63 as illustrated in FIG. 12, the fourth filter (filter 4) 540 passes a broadcast signal of a fourth band (band 4) 64 as illustrated in FIG. 13, and the fifth filter (filter 5) 550 passes a broadcast signal of a fifth band (band 5) 65 as illustrated in FIG. 14.

That is, the signal of the full band 60 sequentially passes through the plurality of digital filters 510, 520, 530, 540 and 550 connected in cascade as illustrated in FIG. 7. In this way, the first to fifth filters 510, 520, 530, 540 and 550 selectively receive only the corresponding divisional signals, respectively.

The plurality of digital filters 510, 520, 530, 540 and 550, each of which is a notch peak filter, may include a comparator 511 for comparing a level of a signal corresponding to one among the plurality of frequency bands, e.g. a first band 61 with a reference level, and selectively applies one between notching and peaking to the signal corresponding to one among the plurality of frequency bands in accordance with comparison results output from the comparator 511.

FIG. 8 representatively illustrates one among the plurality of digital filters 510, 520, 530, 540 and 550, that is, the first filter 510. The filters 510, 520, 530, 540 and 550 have the same structure except a frequency band to be passed therethrough. Accordingly, the structure of FIG. 8 may be applied not only to the first filter 510 but also the other filters, e.g., the second to fifth filters 520, 530, 540 and 550.

Below, the first filter 510 will be described in detail as an example representative of the digital filters 510, 520, 530, 540 and 550 will be described in detail with respect to its operations.

According to this example embodiment, the digital filter, e.g., the notch peak filter 510 of the second signal compensator 152 may be achieved by a secondary infinite impulse response (IIR) filter to perform the notching and peaking as described with reference to FIG. 8.

As illustrated in FIG. 8, the comparator 511 designates a reference level, and compares a level of a signal input corresponding to one among the plurality of frequency bands with the reference level. If the frequency level is high, the IIR filter performs the notching to thereby lower the level. On the other hand, if the frequency level is low, the IIR filter performs the peaking to thereby raise the level.

Here, the notch peak filter 510 is in charge of one among the plurality of frequency bands, for example, a band of 1 MHz, and therefore a Q-factor is not highly set. That is, if the Q-factor becomes high, a bandwidth to be subject to filtering gets narrower. Accordingly, the notch peak filter 510 is designed to have a proper Q-factor and thus cover the band of 1 MHz.

The Q-factor is a factor related to a width divided by a filter when the filter is designed with respect to a signal passing through the filter.

Figure 16:
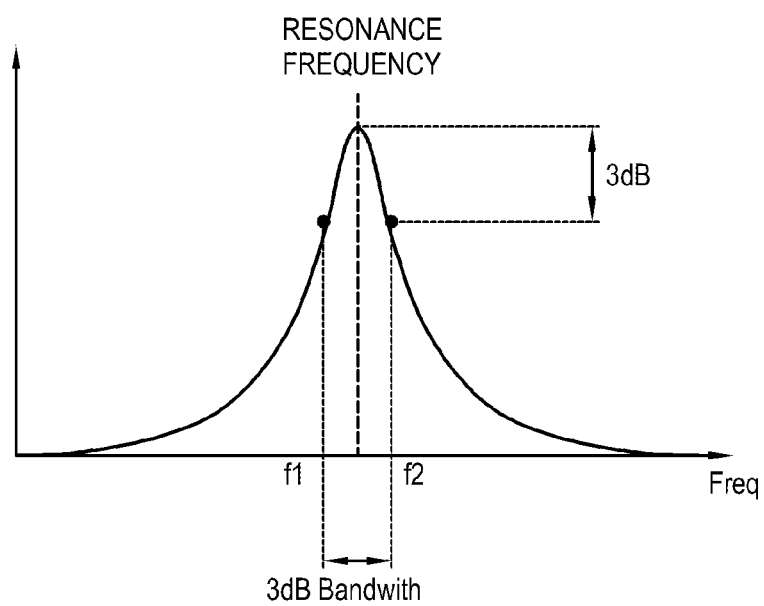
FIG. 16 and FIG. 17 are diagrams illustrating a Q factor of the filter.
Figure 17:
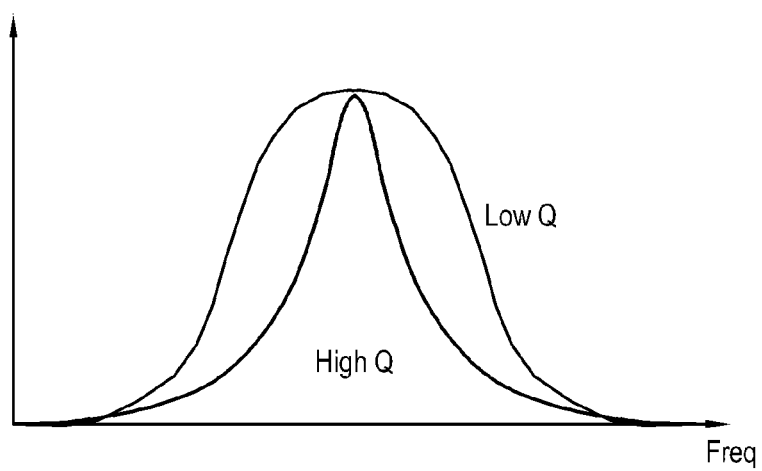

FIG. 16 and FIG. 17 are views for explaining the Q-factor of the filter.

As illustrated in FIG. 16, the quality factor (Q-factor) in resonance refers to quality of a frequency selection characteristic, and is defined by the following equation .

$$Q = \frac{fr}{f2 - f1} = \frac{\text{resonance frequency}}{3 \text{ dB Bandwidth}} \quad [\text{Equation 1}]$$

Referring to FIG. 16 and Equation 1, difference in frequency between both points damped from a resonance frequency point by 3 dB, e.g., by half is so-called a 3 dB bandwidth, and Q is a value obtained by dividing the resonance frequency by the 3 dB bandwidth. Therefore, as illustrated in FIG. 17, if a resonance characteristic becomes sharper, the 3 dB bandwidth gets narrower and therefore Q becomes larger.

For example, the notch peak filter 510 of the second compensator 152 in a band of 2-3 MHz has to have a resonance frequency (fr) of 2.5 MHz, f1 of 2.25 MHz and f2 of 2.75 MHz as a filter proper to a bandwidth (BW) of 1 MHz. In this case, the Q-factor has a value of 1.

Accordingly, the notch peak filter 510 according to an example embodiment may be set to have a Q factor of . However, there are no limits to the Q-factor of the notch peak filter 510. Alternatively, the Q-factor may be properly set in accordance with bandwidths of signals input to the respective filters 510, 520, 530, 540 and 550.

Referring back to FIG. 8, the first digital filter 510 receives a broadcast signal of a corresponding band, e.g., a signal of the first band 61, among the broadcast signals of the full band as an original signal (signal A). The comparator 511 receives the original signal having a level A and a reference signal (signal B) having a level B corresponding to the reference level, and outputs a result of comparison between them.

If a comparison result of the comparator 511 is A>B, 1-step notching is performed so that the level A of the original signal can be cut and lowered by a predetermined level as illustrated in FIG. 8, and comparison is performed again through feedback in the comparator 511. In such a way, the comparison and notching are repetitively performed based on feedback until the deviation between the level of the original signal and the level of the reference signal is within a predetermined allowable range, that is, until A=B. Like this, if the signal A' obtained by applying the notching to the original signal one or more times and the signal B of the reference signal are input to the comparator 511 and a comparison result of A=B is output from the comparator 511, the signal A' passes through the comparator 511 and is finally output from the digital filter 510.

Likewise, if a comparison result of A<B is output from the comparator 511, 1-step peaking is performed so that the level A of the original signal can get a gain and be raised by a predetermined level as illustrated in FIG. 8, and comparison is performed again through feedback in the comparator 511. In such a way, the comparison and peaking are repetitively performed based on feedback until the deviation between the level of the original signal and the level of the reference signal is within a predetermined allowable range, that is, until A=B. Like this, if the signal A' obtained by applying the peaking to the original signal one or more times and the signal B of the reference signal are input to the comparator 511 and a comparison result of A=B is output from the comparator 511, the signal A' passes through the comparator 511 and is finally output from the digital filter 510.

Here, if the level deviation based on the result of the comparison between the original signal (e.g., the signal A) having a predetermined frequency band and the reference signal (e.g., the signal B) is within the allowable range (e.g., A=B), the original signal is output passing through the comparator 511 without the notching or the peaking.

According to an example embodiment, the signals corresponding to the plurality of frequency bands, which pass through the digital filters 510, 520, 530, 540 and 550, are changed into the signals having the levels deviated from the reference level within the allowable range.

The signal of the first band 61, input to the comparator 511 of the first filter 510 is illustrated in FIG. 10, and the comparator 511 compares the level of this signal with the reference level Ref. level. As illustrated in FIG. 10, if the deviation between the level of the signal corresponding to the first band 61 and the reference level is within the allowable range (e.g., A=B), the first digital filter 510 directly passes the signal of the first band 61 without the notching or the peaking.

Likewise, the comparator of the second digital filter 520 compares the level of the signal of the second band 62 as illustrated in FIG. 11 with the reference level. Since the comparison result is A<B, the peaking is performed one or more times. Thus, the second digital filter 520 outputs the signal corresponding to the second band 62, the level of which is raised by a given gain.

Further, the comparator of the third digital filter 530 compares the level of the signal of the third band 63 as illustrated in FIG. 12 with the reference level. Since the comparison result is A<B, the peaking is performed one or more times. Thus, the third digital filter 530 outputs the signal corresponding to the third band 63, the level of which is raised by a given gain. Here, the second digital filter 520 and the third digital filter 530 are different in a degree of raising the level of the signal.

The comparator of the fourth digital filter 540 compares the level of the signal of the fourth band 64 as illustrated in FIG. 13 with the reference level. Since the comparison result is A>B, the notching is performed one or more times. Thus, the fourth digital filter 540 outputs the signal corresponding to the fourth band 64, the level of which is lowered by the notching.

Further, the comparator of the fifth digital filter 550 compares the level of the signal of the fifth band 65 as illustrated in FIG. 14 with the reference level. Since the comparison result is A>B, the notching is performed one or more times. Thus, the fifth digital filter 550 outputs the signal corresponding to the fifth band 65, the level of which is lowered by the notching. Here, the fourth digital filter 540 and the fifth digital filter 550 are different in a degree of lowering the level of the signal.

The levels of the signals are selectively raised or lowered according to the respective bands 61, 62, 63, 64 and 65, while the signals sequentially pass through the first to fifth digital filters 510, 520, 530, 540 and 550 connected in cascade.

Therefore, the broadcast signal output from the second signal compensator 152 has a uniform frequency characteristic, that is, a constant level throughout the full band 16 as illustrated in FIG. 15.

In the example embodiment described with reference to FIG. 8, the notch pitch filter is designed as a secondary IIR filter. However, there are no limits to the kind of filter for the second signal compensator 152. In other words, the second signal compensator 152 according to an example embodiment may be freely designed as long as it compensates the level of the signal according to the plurality of bands based on the comparison with the reference level. For example, the second signal compensator 152 may be achieved by a finite impulse response (FIR) filter.

The automatic gain controller (digital-automatic gain control (D-AGC) 153 automatically controls the gain with respect to the RF broadcast signal so as to keep a constant level of the signal output from the second signal compensator 152 to the DA converter 160.

In the foregoing signal compensator 150 operating in a digital mode according to an example embodiment, the first signal compensator 151 compensates for the ringing characteristic due to the group delay caused by the transmission line characteristic of the transmitter, and the digital filter 510 of the second signal compensator 152 automatically performs the flattening process to keep the constant level according to the plurality of frequency bands. If the level of the signal is changing even though the frequency level is controlled to be constant by the first and second compensators, the D-AGC 153 is used to make the level of the signal constant.

Figure 18:
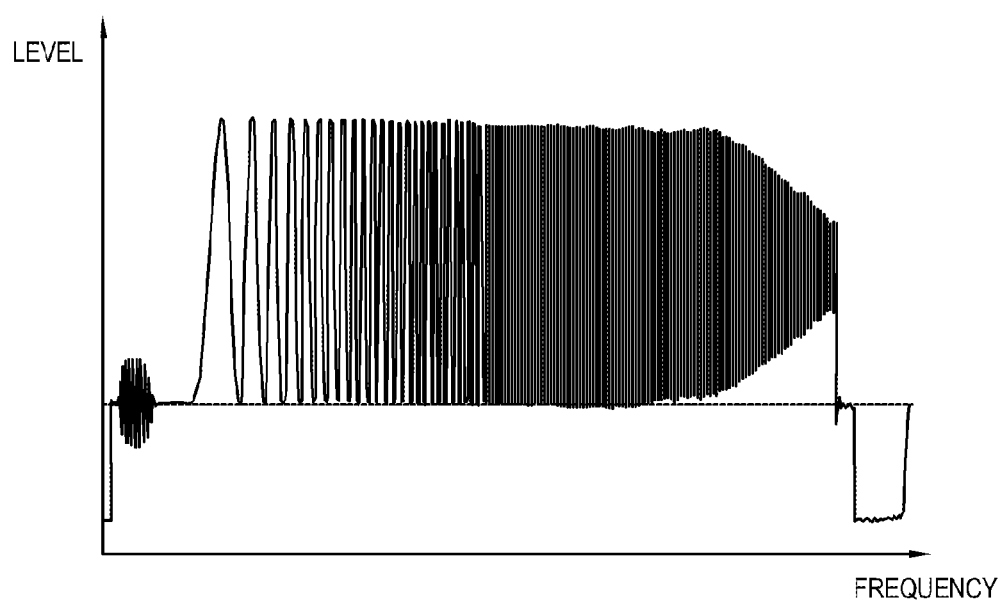
FIG. 18 is a diagram illustrating an example video signal compensated by the signal compensator.

FIG. 18 is a view of showing a video signal compensated by the signal compensator 150.

As illustrated in FIG. 18, the video signal passed through and compensated by the first to third signal compensators 151, 152 and 153 is a signal corresponding to a predetermined frequency band, and has a predetermined level within the frequency band.

Here, as compared with the video signal of FIG. 3 before the compensation, the compensated video signal has a flattened frequency characteristic, e.g., a constant level within the bandwidth, and does not have an abnormal steep rise in the frequency characteristic.

In the broadcast signal receiving apparatus 100 according to an example embodiment described with reference to FIG. 1 to FIG. 18, the broadcast signal is compensated by the first signal compensator 151, the second signal compensator 152 and the automatic gain controller 153, but not limited thereto. Alternatively, only one of the first signal compensator 151 and the second signal compensator 152 may be provided. Further, a signal passed through the second signal compensator 152 may pass through the first signal compensator 151 and be thus compensated. As necessary, the automatic gain controller 153 may be not given.

The DA converter (DAC) 160 converts the compensated RF broadcast signal output from the signal compensator 150 into an analog format signal.

By the way, an audio signal passed through and separated by an audio filter 142 of the signal separator 140 may be output to the DA converter 160, and converted into an analog format signal by the DA converter 160.

According to another example embodiment, if the signal compensator 150 is provided to compensate the audio signal, the DA converter 160 may receive the compensated signal from the signal compensator 150.

Thus, the video and audio signals having the analog format are output to the signal processor 170.

The signal processor 170 performs various video/audio processing processes previously set with regard to an analog radio frequency (RF) broadcast signal received from the DA converter 160. The signal processor 170 sends an output signal generated or combined by performing the video processing processes to the display 180, so that the display 180 can display an image and output a sound corresponding to the broadcast signal.

The signal processor 170 includes a decoder 132 that decodes a broadcast signal according to video formats of the broadcast signal receiving apparatus 100; and a scaler 133 that adjusts the broadcast signal according to output scales of the display 180.

The signal processor 170 may be achieved by an individual group for independently performing each of the processes, or may be achieved by a system-on-chip (SoC) where various functions corresponding to such processes are integrated. That is, the signal processor 170 in this example embodiment may include a main SoC mounted to a printed circuit board (PCB) provided inside the broadcast signal receiving apparatus 100, in which the main SoC may include at least one processor that realizes the controller 190 to be described later. In this case, the broadcast signal receiving apparatus 100 includes a PCB mounted with a tuner chip corresponding to the tuner module I and the main SoC.

The broadcast signal processed by the signal processor 170 is output to the display 180. The display 180 displays an image based on the broadcast signal received from the signal processor 170.

In this embodiment, the display 180 may for example be achieved by liquid crystal, plasma, a light emitting diode (LED), an organic light-emitting diode (OLED), a surface-conduction electron-emitter, a carbon nano-tube (CNT), nano-crystal, or the like various displays, without limitation.

Further, the display 180 may include additional elements in accordance with its types. For example, if the display 180 is achieved by the liquid crystal, the display 180 includes a liquid crystal display (LCD) panel (not shown), a backlight unit (not shown) for supplying light to the LCD panel, and a panel driver (not shown) for driving the panel (not shown).

In this example embodiment, the display 180 may include a touch screen may include a touch screen for receiving input corresponding to a user's touch. The touch screen may be for example achieved by a resistive type, a capacitive type, an infrared type or an acoustic wave type.

The touch screen may display an object (e.g., a menu, a text, an image, a moving image, a figure, an icon and a shortcut icon) including various menu items as a user interface (UI). Thus, a user touches the object displayed on the touch screen with his/her body (e.g., a finger) or a separate pointing device such as a stylus, thereby performing his/her input.

The touch screen may provide a user with a UI corresponding to various services (e.g., a phone call, data transmission, broadcasting, photographing, a moving image or an application). The touch screen sends the controller 190 an analog signal corresponding to a single or multi touch input corresponding to selection on the UI. Here, the touch input includes drag, flick, drag & drop, tap, long tap, etc.

If the broadcast signal receiving apparatus 100 is the set-top box, the broadcast signal receiving apparatus 100 may further include an audio/video (A/V) output (not shown) for outputting a video or audio signal processed by the signal processor 170 to the display apparatus connected by a data communication cable such as a D-sub cable, etc. The A/V output is connected to an A/V input of the display apparatus and transmits the video/audio signal.

The controller 190 performs control with regard various elements of the broadcast signal receiving apparatus 100. Specifically, the controller 190 controls the general operations of the broadcast signal receiving apparatus 100 and signal flow between internal elements 120 to 180 of the broadcast signal receiving apparatus 100 and processes data. For example, the controller 190 performs processing processes for a broadcast signal to be processed by the signal compensator 150 and the signal processor 170, and performs control operations corresponding to a command from the user input interface including an input device, thereby controlling general operations of the broadcast signal receiving apparatus 100.

The controller 190 controls power supplied from a power supply to the internal elements 120 to 180. If there is a user's input or if a previously set and stored condition is satisfied, the controller 190 may perform an operating system (OS) and various applications stored in the storage.

The controller 190 may include at least one processor; a nonvolatile memory, e.g., a read only memory in which a control program for controlling the broadcast signal receiving apparatus 100 is stored; and a volatile memory, e.g., a random access memory (RAM) which stores a signal or data received from the exterior of the broadcast signal receiving apparatus 100, or is used as a storage area for various jobs implemented in the broadcast signal receiving apparatus 100. The processor loads a program from the ROM to the RAM to thereby execute the program.

According to an example embodiment, the controller 190 is achieved by at least one universal processor such as a central processing unit (CPU), an application processor (NP), a microcomputer (MICOM), etc. For example, the controller 190 loads a program into the RAM in accordance with a predetermined algorithm stored in the ROM, and executes the program, thereby controlling the broadcast signal receiving apparatus 100 to do various operations.

If the controller 190 of the broadcast signal receiving apparatus 100 is achieved by a single processor, e.g. The CPU, the CPU may be provided to implement various functions of the broadcast signal receiving apparatus 100, for example, to control various signal processing processes such as AD conversion, demodulation, compensation, DA conversion, decoding, scaling, etc. with regard to an image displayed on the display 140; to respond to a user command received through the user input interface including the input device; to control wired/wireless network communication with the external apparatus through the communicator 160, and so on.

The processor may include single-core, dual-core, triple-core, quad-core and the multiple-core. The processor may include a plurality of processors, for example, a main processor and a sub processor operating in a sleep mode where the display apparatus is idle with only standby power. Further, the processor, the ROM and the RAM are connected to one another by an internal bus.

According to an example embodiment, if the broadcast signal receiving apparatus 100 is a monitor, the controller 190 may further include a graphic processing unit (GPU, not shown) for graphing processing.

Alternatively, if the broadcast signal receiving apparatus 100 is a digital TV, a smart phone or a smart pad, the processor may for example include a GPU in the form of system on chip (SoC) where the core and the GPU are combined.

According to another example embodiment, the controller 190 may include a program for performing a certain function supported in the broadcast signal receiving apparatus 100, and a chip, e.g. an integrated chip (IC) as a dedicated processor for executing the corresponding program.

As an example of the controller 190 in this example embodiment, the processor may be included in the main SoC mounted to the PCB provided inside the broadcast signal receiving apparatus 100. The main SoC may further include the signal processor 170 to process the broadcast signal to be displayed as an image.

As an example of the controller 190 in this example embodiment, the processor may be included in the main SoC mounted to the multi-layer PCB provided inside the broadcast signal receiving apparatus 100. The main SoC may further include the signal processor 170 to process the broadcast signal to be displayed as an image. In this case, the broadcast signal receiving apparatus 100 may include a tuner chip I corresponding to the tuner module 110, and a PCB mounted with the main SoC for performing the functions of the signal processor 170 and the controller 190.

In the example embodiments described with reference to FIG. 7 to FIG. 18, five digital filters 510, 520, 530, 540 and 550 are provided in the second compensator 152 of the signal compensator 150 and pass the signals of five sub bands, but not limited thereto. For example, if a broadcast signal of the PAL scheme is received, the second signal compensator may include six digital filters to pass signals of six sub bands.

Further, in the foregoing embodiment, the signal passing through each digital filter has the bandwidth of 1 MHz, but not limited thereto. Alternatively, the bandwidth of each filter may be variously set within a range where a signal can be efficiently compensated.

FIG. 8 illustrates an example that the plurality of digital filters 510, 520, 530, 540 and 550 include the comparators and are connected in cascade, but not limited thereto. Alternatively, the second signal compensator 152 may be variously achieved as long as it can receive a full band signal according to sub bands and perform compensation based on the level comparison.

For example, in case of the NTSC broadcasting scheme, the second signal compensator 152 includes five bandpass filters (BPF) for separating the full band signal according to the plurality of bands, and the signals separated through the respective bandpass filters sequentially pass the comparator and the notch pitch filter. In this case, there are provided five digital filters, which are each provided with the comparator and the secondary IIR filter, and each bandpass filter is connected in series with the corresponding digital filter. Further, the bandpass filters are connected in parallel with each other, and the digital filters are also connectable in parallel with each other.

Further, the outputs from the plurality of digital filters are connected to a filter (e.g. an all pass filter (APF)) where the signals separated according to the sub bands, and output as the full band signal to the DA converter 160.

Figure 19:
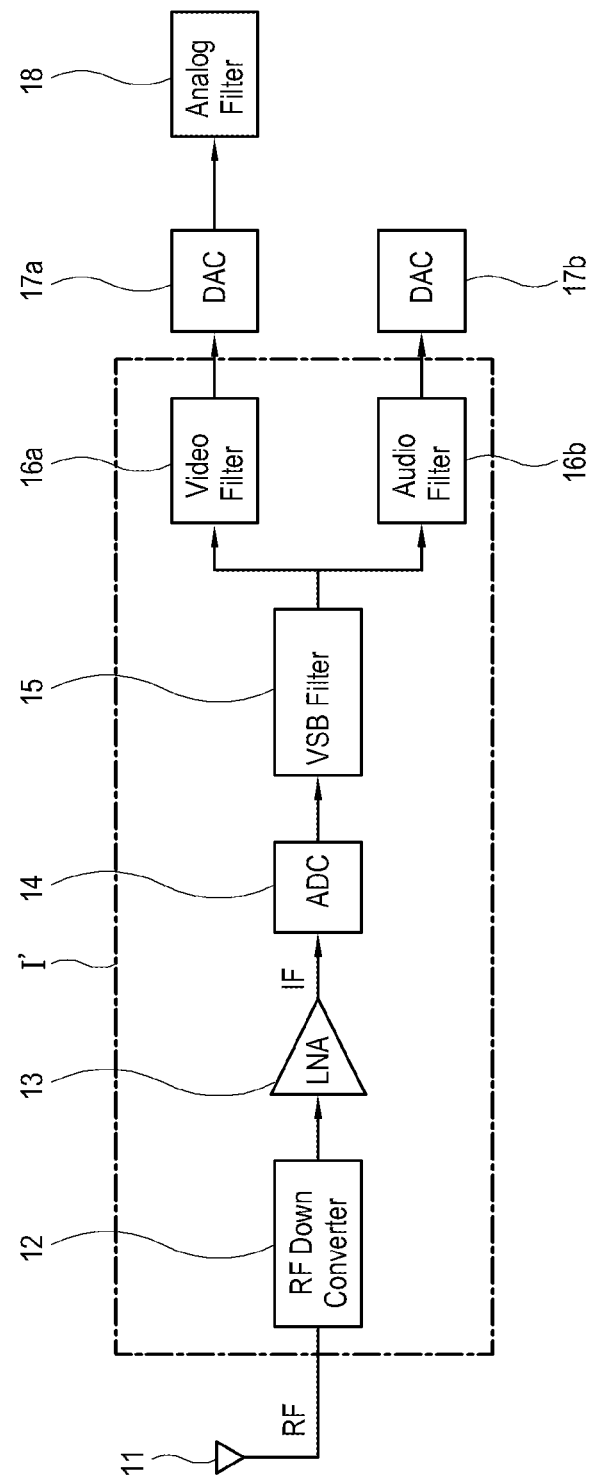
FIG. 19 is a diagram illustrating example elements of the broadcast signal receiving apparatus with an analog filter according to an example embodiment.
Figure 20:
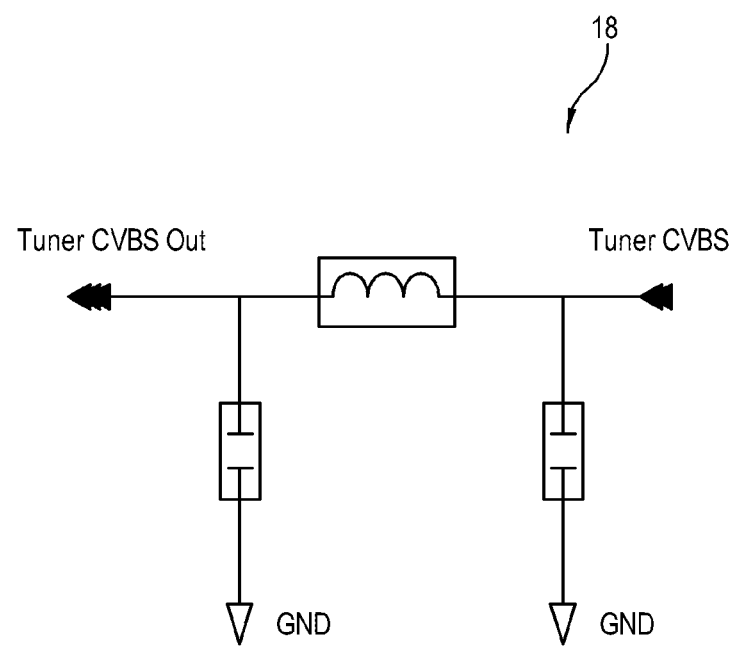
FIG. 20 is a circuit diagram illustrating an example analog filter of FIG. 19.

In addition, the broadcast signal receiving apparatus 100 may further include an analog filter 19 provided for compensating the frequency characteristic as illustrated in FIGS. 19 and 20.

FIG. 19 is a diagram illustrating example elements of the broadcast signal receiving apparatus with the analog filter 19 according to an example embodiment, and FIG. 20 is a circuit diagram of the analog filter of FIG. 19.

On the contrary to the signal compensator 150 of the FIGS. 1 to 18, which includes the digital filter and automatically compensating the broadcast signal by a digital method, the embodiment illustrated in FIG. 19 and FIG. 20 discloses that the broadcast signal is converted to have an analog format by the DA converters 17a and 17b and then compensated by the analog filter 18.

As illustrated in FIG. 19, the RF broadcast signal received through the antenna 11 having a high frequency is converted to have an intermediate frequency band by an RF down converter 12, amplified by the low noise amplifier (LNA) 13, and output to an AD converter 14.

The AD converter 14 converts the received IF signal into a signal having a digital format. The signal having the digital format passes through the channel filter 15 and then separated into a video signal and an audio signal through a video filter 16a and an audio filter 16b.

The video signal is converted to have an analog format by a first DA converter 17a, and the audio signal is converted to have an analog format by a second DA converter 17b.

The video signal converted to have an analog format in the embodiment of FIG. 19 may have portions where its level is not constant within the frequency band but abnormally becomes larger. Therefore, the frequency characteristic of this video signal is compensated by the analog filter 18.

The analog filter 18 may be achieved by an LPF, a HPF, a BPF, etc. As illustrated in FIG. 20, the analog filter 18 includes an RLC passive device, and therefore the characteristic of the analog filter 18 is fixed by a fixed time constant of the RLC. Accordingly, the structure of the filter or the time constant may be varied depending on a developed PCB pattern. To get a desired characteristic, the filter may be tuned while changing its LC value. Further, there may be needed matching in accordance with the PCB models.

As compared with using the analog filter 18 having the fixed compensation value as illustrated in FIG. 19 and FIG. 20, the digital signal compensator 150 of FIG. 1 to FIG. 18 provides an active signal compensation function for automatic frequency tuning. Therefore, it is possible to flexibly cope with various factors, which may change the frequency characteristic, such as change in the PCB pattern.

Below, a method of controlling the broadcast signal receiving apparatus 100 according to an example embodiment will be described.

Figure 21:
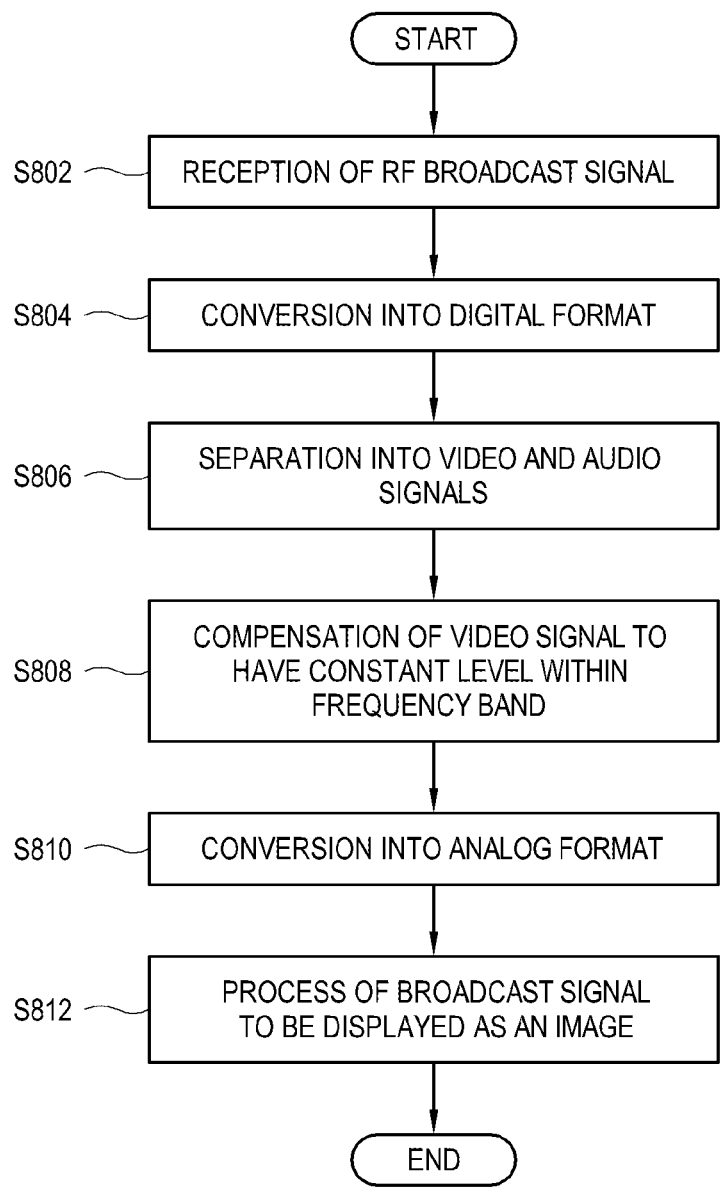
FIG. 21 is a flowchart illustrating an example of controlling the broadcast signal receiving apparatus according to an example embodiment.

FIG. 21 is a flowchart illustrating an example of controlling the broadcast signal receiving apparatus according to an example embodiment.

As illustrated in FIG. 21, the broadcast signal receiving apparatus 100 receives an RF broadcast signal (S802). Here, the received RF broadcast signal is an analog broadcast signal having a high frequency, which may be received through an antenna 111 of the signal receiver 110, a cable connection terminal, etc. The received broadcast signal is converted to have an intermediate frequency band by the frequency converter 112, and amplified by the low noise amplifier 113.

The RF broadcast signal received in the operation S802 is converted to have the digital format through sampling, quantizing, coding and the like processes in the AD converter 120 (S804).

The broadcast signal converted to have the digital format in the operation S804 is separated into the video signal and the audio signal through the video filter 141 and the audio filter 142 of the signal separator 140 (S806).

The signal compensator 150 compensates the video signal separated in the operation S806 so as to keep the level of the signal constant level within the frequency band (S808). Here, the first signal compensator 151 compensates the input full band signal by an algorithm having an inverse function characteristic to the frequency response due to the group delay occurring in the transmitter. The second signal compensator 152 separates the input full band signal according to the plurality of frequency bands (e.g., sub bands) by the plurality of digital filters (e.g. the notch pitch filters) 510, 520, 530, 540 and 550 connected in cascade, and compares the level of the signal corresponding to each frequency band with the reference level, thereby selectively performing the notching or the peaking in response to the comparison result. Further, the signal compensated by the first signal compensator 151 and/or the second signal compensator 152 is controlled to keep the constant level by the automatic gain controller 153.

Accordingly, the signal passed through the signal compensator 150 has a flattened pattern where the level of the signal is kept constant within a predetermined frequency band as illustrated in FIG. 18.

Further, the broadcast signal (e.g., the video signal) compensated in the operation S808 is converted to have an analog format by the DA converter 160 (S810). The DA converter 160 receives an audio signal separated in the operation S806 and converts it to have an analog format.

The RF broadcast signal converted to have the analog format in the operation S810 is processed by the signal processor 170 so as to be displayed as an image on the display 130 (S812). Here, the processes of the broadcast signal include decoding and scaling, and may further include additional processes for improving image/sound quality as necessary. The broadcast signal processed in the operation S812 is output to the display 180 provided inside or outside the broadcast signal receiving apparatus 100 and displayed as an image.

According to the foregoing embodiments, the broadcast signal receiving apparatus 100 for receiving an analog broadcast signal includes the signal compensator 140 that compensates for distortion of the broadcast signal converted to have a digital format, thereby compensating the signal through automatic control in real time.

Specifically, it is possible to address the ringing phenomenon due to the group delay through the first signal compensator 141 achieved by the digital filter using the inverse function to the frequency response having the opposite form of the group delay occurring in the transmitter.

Further, the level of the signal is compared with the reference level according to the plurality of frequency bands, and the level of the signal is flattened throughout the full band by the second signal compensator 142 that lowers/raises the level of the signal according to the respective bands, thereby effectively compensating for the distortion of the signal in a partial frequency band.

Further, the automatic gain controller 143 for applying automatic gain control to the compensated signal is additionally provided to keep the constant level of the signal output from the signal compensator 150.

Thus, according to an example embodiment, the signal compensator 140 employs the digital filters, and it is thus possible to minimize the distortion of the signal through the active control.

Accordingly, it is possible to flexibly cope with change in a PCB pattern, input of a nonstandard signal, or the like unpredictable environmental factors, and secure stability of the apparatus, thereby providing more improved viewing environments/services.

Therefore, it is advantageous for a manufacturer to reduce complicated and unnecessary processes due to circuit design since there is no need of a separate analog filter for compensating a signal.

By the way, the foregoing example embodiments may be realized in a computer-readable recording medium. The computer-readable recording medium includes a transfer medium and a storage medium for storing data readable by a computer system. The transfer medium is materialized by a wired/wireless network to which the computer system is connected.

The foregoing example embodiments may be realized by hardware and combination between hardware and software. As the hardware, the controller 190 may include a nonvolatile memory in which the software, e.g., a computer program is stored, a RAM to which the computer program stored in the nonvolatile memory is loaded, and a CPU for executing the computer program loaded to the RAM. The nonvolatile memory includes a hard disk drive, a flash memory, a ROM, CD-ROMs, magnetic tapes, a floppy disc, an optical storage, a data transfer apparatus using Internet, etc., but not limited thereto. The nonvolatile memory is a kind of computer-readable recording medium in which a program readable by a computer is recorded.

The computer program is a code that is read and executed by the CPU, and includes codes for performing the operations S802 to S810 of the controller 190 illustrated in FIG. 21.

The computer program may be included in an operating system provided in the broadcast signal receiving apparatus 100 or software including an application and/or software interfacing with an external apparatus.

Although a few example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A broadcast signal receiving apparatus comprising:
a signal receiver configured to receive a radio frequency (RF) broadcast signal;
an analog-to-digital (AD) converter configured to convert the received RF broadcast signal to have a digital format;
a signal compensator comprising signal compensating circuitry configured to compensate the RF broadcast signal so that the RF broadcast signal having the digital format has a substantially constant level within a predetermined frequency band; and
a digital-to-analog (DA) converter configured to convert the compensated RF broadcast signal to have an analog format,
wherein the signal compensator comprises
a first signal compensator comprising first signal compensating circuitry configured to flatten a level of the RF broadcast signal of a full band corresponding to the frequency band by a predetermined algorithm; and
a second signal compensator comprising second signal compensating circuitry configured to divide the flattened RF broadcast signal in accordance with a plurality of frequency bands, and to flatten levels of the divided signals respectively corresponding to the plurality of frequency bands.

2. The broadcast signal receiving apparatus according to claim 1, wherein the first signal compensator is configured to flatten the level of the RF broadcast signal corresponding to the full band by an algorithm having an inverse function characteristic to a frequency response due to a group delay occurring in a transmitter for the RF broadcast signal.

3. The broadcast signal receiving apparatus according to claim 1, wherein the second signal compensator comprises a comparator configured to compare the level of the signal corresponding to one among the plurality of frequency bands with a predetermined reference level, and a plurality of digital filters configured to selectively apply one of notching and peaking to the signal corresponding to one among the plurality of frequency bands based on a comparison result output from the comparator.

4. The broadcast signal receiving apparatus according to claim 3, wherein the plurality of digital filters are connected in cascade, and comprise a secondary infinite impulse response (IIR) filter.

5. The broadcast signal receiving apparatus according to claim 1, wherein the signal compensator further comprises an automatic gain controller comprising automatic gain control circuitry configured to automatically control a gain with respect to the compensated RF broadcast signal to keep a substantially constant level of the signal output to the DA converter.

6. The broadcast signal receiving apparatus according to claim 1, further comprising a signal separator comprising signal separating circuitry configured to separate the RF broadcast signal converted to have the digital format into a video signal and an audio signal,
wherein the signal compensator is configured to perform compensation with respect to the separated video signal.

7. A broadcast signal receiving apparatus comprising:
a signal receiver configured to receive a radio frequency (RF) broadcast signal;
an analog-to-digital (AD) converter configured to convert the received RF broadcast signal to have a digital format;
a signal separator comprising signal separating circuitry configured to separate the RF broadcast signal having the digital format into a video signal and an audio signal; and
a signal compensator comprising signal compensating circuitry configured to compensate the video signal so that the separated video signal has a substantially constant level within a predetermined frequency band, wherein the signal compensator comprises a first signal compensator comprising first signal compensating circuitry configured to flatten the level of the video signal of the full band corresponding to the frequency band by an algorithm having an inverse function characteristic to a frequency response due to a group delay occurring in a transmitter for the RF broadcast signal.

8. The broadcast signal receiving apparatus according to claim 7, wherein the signal compensator comprises a second signal compensator comprising second signal compensating circuitry configured to compare the level of the video signal with a predetermined reference level in accordance with a plurality of frequency bands, and to selectively adjust the levels of signals respectively corresponding to the plurality of frequency bands based on a comparison result.

9. The broadcast signal receiving apparatus according to claim 7, further comprising a digital-to-analog (DA) converter configured to convert the compensated RF broadcast signal to have an analog format, wherein the signal compensator further comprises an automatic gain controller comprising automatic gain control circuitry configured to automatically control a gain with respect to the compensated RF broadcast signal to keep a substantially constant level of the signal output to the DA converter.

10. A method of controlling a broadcast signal receiving apparatus, the method comprising:

receiving a radio frequency (RF) broadcast signal;

converting the received RF broadcast signal to have a digital format;

compensating the RF broadcast signal so that the RF broadcast signal having the digital format has a substantially constant level within a predetermined frequency band; and converting the compensated RF broadcast signal to have an analog format, wherein compensating the RF broadcast signal comprises
flattening a level of the RF broadcast signal of a full band corresponding to the frequency band by a predetermined algorithm; and
dividing the flattened RF broadcast signal according to a plurality of frequency bands, and flattening levels of the divided signals respectively corresponding to the plurality of frequency bands.

11. The method according to claim 10, wherein the flattening of the level of the RF broadcast signal comprises flattening the level of the RF broadcast signal corresponding to the full band by an algorithm having an inverse function characteristic to a frequency response due to a group delay occurring in a transmitter for the RF broadcast signal.

12. The method according to claim 10, wherein the flattening the levels of the divided signals comprises
comparing the level of the signal corresponding to one among the plurality of frequency bands with a predetermined reference level; and
selectively applying one of a notching and a peaking to the signal corresponding to one among the plurality of frequency bands based on a comparison result output from a comparator.

13. The method according to claim 10, wherein compensating the RF broadcast signal comprises automatically controlling a gain with respect to the compensated RF broadcast signal to keep a substantially constant level of the signal.

14. The method according to claim 10, further comprising separating the RF broadcast signal converted to have the digital format into a video signal and an audio signal,
wherein compensating the RF broadcast signal comprises performing compensation with respect to the separated video signal.

* * * * *